United States Patent
He et al.

(10) Patent No.: US 12,230,820 B2
(45) Date of Patent: Feb. 18, 2025

(54) POWER BATTERY PACK AND ELECTRIC VEHICLE

(71) Applicant: BYD COMPANY LIMITED, Guangdong (CN)

(72) Inventors: Long He, Shenzhen (CN); Huajun Sun, Shenzhen (CN); Wenfeng Jiang, Shenzhen (CN); Zhipei Lu, Shenzhen (CN); Weixin Zheng, Shenzhen (CN); Jianglong Tang, Shenzhen (CN); Yan Zhu, Shenzhen (CN); Xinyue Wang, Shenzhen (CN); Kefeng He, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 671 days.

(21) Appl. No.: 17/422,130

(22) PCT Filed: Jun. 21, 2019

(86) PCT No.: PCT/CN2019/092392
§ 371 (c)(1),
(2) Date: Jul. 9, 2021

(87) PCT Pub. No.: WO2020/143176
PCT Pub. Date: Jul. 16, 2020

(65) Prior Publication Data
US 2022/0126666 A1    Apr. 28, 2022

(30) Foreign Application Priority Data

Jan. 9, 2019    (CN) .......................... 201910020925.5
Jan. 9, 2019    (CN) .......................... 201910020967.9
(Continued)

(51) Int. Cl.
*B60K 1/04*    (2019.01)
*B60L 50/60*   (2019.01)
(Continued)

(52) U.S. Cl.
CPC ............. *H01M 50/209* (2021.01); *B60K 1/04* (2013.01); *B60L 50/64* (2019.02); *B60L 50/66* (2019.02);
(Continued)

(58) Field of Classification Search
CPC ............. H01M 50/209; H01M 50/249; H01M 2220/20; H01M 50/3425; B60K 1/04;
(Continued)

(56) References Cited

U.S. PATENT DOCUMENTS 8,268,469 B2    9/2012  Hermann et al.
8,276,697 B2 *  10/2012 Takasaki ............... B60L 3/0007
                                                      903/952
(Continued)

FOREIGN PATENT DOCUMENTS

CN    1134041 A      10/1996
CN    101034753 A    9/2007
(Continued)

OTHER PUBLICATIONS

International Search Report of PCT/CN2019/092392 dated Oct. 22, 2019 (2 pages).

*Primary Examiner* — Jason D Shanske
*Assistant Examiner* — James J Triggs

(57) ABSTRACT

Provided are a power battery pack and an electric vehicle. The power battery pack includes: a pack body; and a plurality of cells, directly arranged in the pack body. The cell extends from a first side of the pack body to a second side of the pack body, and the first side and the second side are disposed opposite to each other. The first side of the pack (Continued)

body is provided with a first side wall, the second side of the pack body is provided with a second side wall, an end of the cell is supported by the first side wall, and the other end of the cell is supported by the second side wall.

30 Claims, 11 Drawing Sheets

(30) Foreign Application Priority Data

| Jan. 9, 2019 | (CN) | 201910021244.0 |
|---|---|---|
| Jan. 9, 2019 | (CN) | 201910021246.X |
| Jan. 9, 2019 | (CN) | 201910021247.4 |
| Jan. 9, 2019 | (CN) | 201910021248.9 |

(51) Int. Cl.

| B60L 50/64 | (2019.01) |
|---|---|
| H01M 10/052 | (2010.01) |
| H01M 10/42 | (2006.01) |
| H01M 10/613 | (2014.01) |
| H01M 10/625 | (2014.01) |
| H01M 10/647 | (2014.01) |
| H01M 10/6551 | (2014.01) |
| H01M 10/6554 | (2014.01) |
| H01M 50/103 | (2021.01) |
| H01M 50/119 | (2021.01) |
| H01M 50/209 | (2021.01) |
| H01M 50/244 | (2021.01) |
| H01M 50/249 | (2021.01) |
| H01M 50/271 | (2021.01) |
| H01M 50/317 | (2021.01) |
| H01M 50/342 | (2021.01) |
| H01M 50/35 | (2021.01) |
| H01M 50/383 | (2021.01) |
| H01M 50/531 | (2021.01) |
| H01M 50/543 | (2021.01) |
| B60L 58/26 | (2019.01) |

(52) U.S. Cl.
CPC ....... *H01M 10/052* (2013.01); *H01M 10/425* (2013.01); *H01M 10/613* (2015.04); *H01M 10/625* (2015.04); *H01M 10/647* (2015.04); *H01M 10/6551* (2015.04); *H01M 10/6554* (2015.04); *H01M 50/103* (2021.01); *H01M 50/119* (2021.01); *H01M 50/244* (2021.01); *H01M 50/249* (2021.01); *H01M 50/271* (2021.01); *H01M 50/317* (2021.01); *H01M 50/342* (2021.01); *H01M 50/3425* (2021.01); *H01M 50/35* (2021.01); *H01M 50/383* (2021.01); *H01M 50/531* (2021.01); *H01M 50/543* (2021.01); *B60K 2001/0405* (2013.01); *B60K 2001/0438* (2013.01); *B60L 58/26* (2019.02); *H01M 2010/4271* (2013.01); *H01M 2220/20* (2013.01)

(58) Field of Classification Search
CPC .. B60K 2001/0438; B60L 50/64; B60L 50/66
See application file for complete search history.

(56) References Cited

U.S. PATENT DOCUMENTS

| 8,592,063 | B1* | 11/2013 | Musetti | H01M 50/308 |
|---|---|---|---|---|
| | | | | 137/511 |
| 9,083,062 | B2 | 7/2015 | Kumar et al. | |
| 9,843,027 | B1 | 12/2017 | Spotnitz et al. | |
| 10,017,037 | B2* | 7/2018 | Newman | H01M 50/271 |
| 10,099,546 | B2 | 10/2018 | Hara et al. | |
| 11,043,714 | B2* | 6/2021 | Sloan | B60L 50/64 |
| 2002/0086578 | A1 | 7/2002 | Ikeda | |
| 2003/0152825 | A1 | 8/2003 | Siddiqui et al. | |
| 2004/0058233 | A1 | 3/2004 | Hamada et al. | |
| 2007/0015049 | A1 | 1/2007 | Hamada et al. | |
| 2007/0243462 | A1 | 10/2007 | Nagatani et al. | |
| 2011/0244296 | A1 | 10/2011 | Okuda et al. | |
| 2012/0021260 | A1 | 1/2012 | Yasui et al. | |
| 2012/0028105 | A1 | 2/2012 | Kumar et al. | |
| 2013/0130070 | A1 | 5/2013 | Adachi et al. | |
| 2013/0175829 | A1 | 7/2013 | Kim et al. | |
| 2013/0196192 | A1 | 8/2013 | Harada et al. | |
| 2014/0020969 | A1 | 1/2014 | Okada et al. | |
| 2014/0120391 | A1 | 5/2014 | Park | |
| 2014/0127552 | A1 | 5/2014 | Lu et al. | |
| 2015/0086842 | A1 | 3/2015 | Kang et al. | |
| 2016/0064781 | A1 | 3/2016 | Specht et al. | |
| 2016/0133889 | A1 | 5/2016 | Tseng et al. | |
| 2016/0226034 | A1 | 8/2016 | Seok et al. | |
| 2016/0301045 | A1 | 10/2016 | Tyler et al. | |
| 2017/0088182 | A1 | 3/2017 | Hara | |
| 2017/0098807 | A1 | 4/2017 | Umeyama et al. | |
| 2017/0187011 | A1 | 6/2017 | Cho | |
| 2017/0214008 | A9 | 7/2017 | Mardall et al. | |
| 2017/0237113 | A1 | 8/2017 | Ruehle et al. | |
| 2017/0305249 | A1 | 10/2017 | Hara | |
| 2017/0331090 | A1 | 11/2017 | Li et al. | |
| 2018/0013113 | A1 | 1/2018 | Wuensche et al. | |
| 2018/0166735 | A1 | 6/2018 | Busacca et al. | |
| 2018/0194235 | A1 | 7/2018 | Kim et al. | |
| 2018/0229593 | A1 | 8/2018 | Hitz et al. | |
| 2018/0287213 | A1 | 10/2018 | Sato et al. | |
| 2018/0337374 | A1 | 11/2018 | Matecki et al. | |
| 2018/0337378 | A1 | 11/2018 | Stephens et al. | |
| 2019/0044114 | A1 | 2/2019 | Demar | |
| 2020/0140018 | A1 | 5/2020 | Grottke et al. | |

FOREIGN PATENT DOCUMENTS

| CN | 101079477 A | 11/2007 |
|---|---|---|
| CN | 101145059 A | 3/2008 |
| CN | 101257100 A | 9/2008 |
| CN | 101305488 A | 11/2008 |
| CN | 201146206 Y | 11/2008 |
| CN | 101521265 A | 9/2009 |
| CN | 101877413 A | 11/2010 |
| CN | 201766132 U | 3/2011 |
| CN | 102104122 A | 6/2011 |
| CN | 202210539 U | 5/2012 |
| CN | 202217748 U | 5/2012 |
| CN | 202332978 U | 7/2012 |
| CN | 102683907 A | 9/2012 |
| CN | 102893426 A | 1/2013 |
| CN | 202712297 U | 1/2013 |
| CN | 102956934 A | 3/2013 |
| CN | 103269941 A | 8/2013 |
| CN | 203150637 U | 8/2013 |
| CN | 103296302 A | 9/2013 |
| CN | 203600973 U | 5/2014 |
| CN | 103928642 A | 7/2014 |
| CN | 203760534 U | 8/2014 |
| CN | 203983373 U | 12/2014 |
| CN | 204029891 U | 12/2014 |
| CN | 104576999 A | 4/2015 |
| CN | 104795527 A | 7/2015 |
| CN | 204614833 U | 9/2015 |
| CN | 204651372 U | 9/2015 |
| CN | 204668376 U | 9/2015 |
| CN | 105244462 A | 1/2016 |
| CN | 105322222 A | 2/2016 |
| CN | 105489828 A | 4/2016 |
| CN | 205159465 U | 4/2016 |
| CN | 205282524 U | 6/2016 |
| CN | 205282525 U | 6/2016 |
| CN | 105762316 A | 7/2016 |
| CN | 205621793 U | 10/2016 |
| CN | 106182714 A | 12/2016 |
| CN | 106257714 A | 12/2016 |

(56) References Cited

FOREIGN PATENT DOCUMENTS

| | | |
|---|---|---|
| CN | 106299166 A | 1/2017 |
| CN | 205900631 U | 1/2017 |
| CN | 205900638 U | 1/2017 |
| CN | 106450089 A | 2/2017 |
| CN | 106486625 A | 3/2017 |
| CN | 205992578 U | 3/2017 |
| CN | 206040913 U | 3/2017 |
| CN | 106558659 A | 4/2017 |
| CN | 106575728 A | 4/2017 |
| CN | 106605314 A | 4/2017 |
| CN | 206134803 U | 4/2017 |
| CN | 206134820 U | 4/2017 |
| CN | 106627081 A | 5/2017 |
| CN | 106684287 A | 5/2017 |
| CN | 206259400 U | 6/2017 |
| CN | 106953039 A | 7/2017 |
| CN | 106992273 A | 7/2017 |
| CN | 206364073 U | 7/2017 |
| CN | 107112443 A | 8/2017 |
| CN | 206374545 U | 8/2017 |
| CN | 107123769 A | 9/2017 |
| CN | 107195829 A | 9/2017 |
| CN | 107248557 A | 10/2017 |
| CN | 107275710 A | 10/2017 |
| CN | 107293809 A | 10/2017 |
| CN | 107394063 A | 11/2017 |
| CN | 107394279 A | 11/2017 |
| CN | 107437594 A | 12/2017 |
| CN | 107611296 A | 1/2018 |
| CN | 107644962 A | 1/2018 |
| CN | 206864505 U | 1/2018 |
| CN | 206893769 U | 1/2018 |
| CN | 107681076 A | 2/2018 |
| CN | 107785511 A | 3/2018 |
| CN | 107833996 A | 3/2018 |
| CN | 107925028 A | 4/2018 |
| CN | 107946506 A | 4/2018 |
| CN | 107946692 A | 4/2018 |
| CN | 207233816 U | 4/2018 |
| CN | 107978800 A | 5/2018 |
| CN | 108011069 A | 5/2018 |
| CN | 108075065 A | 5/2018 |
| CN | 207381449 U | 5/2018 |
| CN | 207398218 U | 5/2018 |
| CN | 207425959 U | 5/2018 |
| CN | 207474601 U | 6/2018 |
| CN | 207530003 U | 6/2018 |
| CN | 207559010 U | 6/2018 |
| CN | 207664083 U | 7/2018 |
| CN | 108370075 A | 8/2018 |
| CN | 108417747 A | 8/2018 |
| CN | 207705320 U | 8/2018 |
| CN | 207743294 U | 8/2018 |
| CN | 207800740 U | 8/2018 |
| CN | 108493384 A | 9/2018 |
| CN | 108598354 A | 9/2018 |
| CN | 207818697 U | 9/2018 |
| CN | 207818836 U | 9/2018 |
| CN | 108717961 A | 10/2018 |
| CN | 207967121 U | 10/2018 |
| CN | 207967123 U | 10/2018 |
| CN | 208014765 U | 10/2018 |
| CN | 208014778 U | 10/2018 |
| CN | 108749548 A | 11/2018 |
| CN | 108777268 A | 11/2018 |
| CN | 108933203 A | 12/2018 |
| CN | 108933296 A | 12/2018 |
| CN | 108963184 A | 12/2018 |
| CN | 208256768 U | 12/2018 |
| CN | 208256770 U | 12/2018 |
| CN | 109148771 A | 1/2019 |
| CN | 110165115 A | 8/2019 |
| CN | 110165117 A | 8/2019 |
| DE | 4407156 C1 | 6/1995 |
| DE | 10328209 A1 | 1/2005 |
| DE | 102017206566 A1 | 10/2017 |
| DE | 202017101961 U1 | 7/2018 |
| DE | 102017209342 A1 | 12/2018 |
| EP | 1978578 A2 | 10/2008 |
| EP | 2490276 A2 | 8/2012 |
| EP | 2562843 A1 | 2/2013 |
| EP | 2565958 A1 | 3/2013 |
| EP | 3004246 A1 | 4/2016 |
| EP | 3331055 A1 | 6/2018 |
| EP | 3386001 A1 | 10/2018 |
| EP | 3386002 A1 | 10/2018 |
| FR | 2951029 A1 | 4/2011 |
| JP | H02138858 U | 11/1990 |
| JP | H07186734 A | 7/1995 |
| JP | H09274899 A | 10/1997 |
| JP | 2000-351328 A | 12/2000 |
| JP | 2001185093 A | 7/2001 |
| JP | 2001-256942 A | 9/2001 |
| JP | 2001-313009 A | 11/2001 |
| JP | 2002-298827 A | 10/2002 |
| JP | 2003-007345 A | 1/2003 |
| JP | 2004063436 A | 2/2004 |
| JP | 2006-054189 A | 2/2006 |
| JP | 2007-134178 A | 5/2007 |
| JP | 2008-171628 A | 7/2008 |
| JP | 2012-064358 A | 3/2012 |
| JP | 2012174532 A | 9/2012 |
| JP | 2012-243438 A | 12/2012 |
| JP | 2013-069691 A | 4/2013 |
| JP | 2013157156 A | 8/2013 |
| JP | 2013-211197 A | 10/2013 |
| JP | 2013225420 A | 10/2013 |
| JP | 2014-022277 A | 2/2014 |
| JP | 2014-080116 A | 5/2014 |
| JP | 2014-164795 A | 9/2014 |
| JP | 2015-022915 A | 2/2015 |
| JP | 2015-057759 A | 3/2015 |
| JP | 2016-100308 A | 5/2016 |
| JP | 2016-122572 A | 7/2016 |
| JP | 2017-054683 A | 3/2017 |
| JP | 2017-111893 A | 6/2017 |
| JP | 2017-162806 A | 9/2017 |
| JP | 2017-196941 A | 11/2017 |
| JP | 2017-197093 A | 11/2017 |
| JP | 2017196959 A | 11/2017 |
| JP | 2017-228391 A | 12/2017 |
| JP | 2018-073552 A | 5/2018 |
| JP | 2018-077979 A | 5/2018 |
| JP | 2018-106822 A | 7/2018 |
| JP | 2018-110048 A | 7/2018 |
| JP | 2018524759 A | 8/2018 |
| JP | 2018-176961 A | 11/2018 |
| JP | 2018-206495 A | 12/2018 |
| JP | 2018536975 A | 12/2018 |
| JP | 6595108 B2 | 10/2019 |
| KR | 20090000307 A | 1/2009 |
| KR | 20120049020 A | 5/2012 |
| KR | 20130076660 A | 7/2013 |
| KR | 20130140245 A | 12/2013 |
| KR | 20140138674 A | 12/2014 |
| KR | 20160076156 A | 6/2016 |
| KR | 20170023595 A | 3/2017 |
| KR | 20170053429 A | 5/2017 |
| KR | 20180112017 A | 10/2018 |
| TW | 200840170 A | 10/2008 |
| TW | I319637 B | 1/2010 |
| TW | I525879 B | 3/2016 |
| WO | 2010114317 A2 | 10/2010 |
| WO | 2011060980 A1 | 5/2011 |
| WO | 2012039013 A1 | 3/2012 |
| WO | 2013031614 A1 | 3/2013 |
| WO | 2013069308 A1 | 5/2013 |
| WO | 2013161370 A1 | 10/2013 |
| WO | 2015173999 A1 | 11/2015 |
| WO | 2015186849 A1 | 12/2015 |
| WO | 2016174855 A1 | 11/2016 |
| WO | 2017078264 A1 | 5/2017 |
| WO | 2017221536 A1 | 12/2017 |
| WO | 2018087681 A1 | 5/2018 |

(56) References Cited

FOREIGN PATENT DOCUMENTS

| WO | 2018125641 A1 | 7/2018 |
|----|---------------|--------|
| WO | 2018/198895 A1 | 11/2018 |
| WO | 2019/001357 A1 | 1/2019 |

\* cited by examiner

POWER BATTERY PACK AND ELECTRIC VEHICLE

CROSS-REFERENCE TO RELATED APPLICATIONS

This application is a National Stage of PCT Application No. PCT/CN2019/092392, filed on Jun. 21, 2019, which claims priority to Chinese Patent Application Serial Nos. "201910021244.0", "201910020967.9". "201910021246.X" "201910021248.9", "201910021247.4", and "201910020925.5", filed by BYD Company Limited on Jan. 9, 2019, which are incorporated by reference in this application in their entireties.

FIELD

This application relates to the field of battery technologies, and specifically, to a power battery pack and an electric vehicle having the power battery pack.

BACKGROUND

In the related art, for example, a power battery pack, such as that applied to an electric vehicle, mainly includes a pack body and a plurality of battery modules mounted in the pack body. Each battery module is an assembly of a plurality of cells.

As users have increasingly high requirements on the battery life of electric vehicles, the use of a prior-art power battery pack in the limited space at the bottom of the vehicle leads to low space utilization. In addition, energy density of the power battery pack cannot meet the demand, which has gradually become an important factor hindering the development of electric vehicles.

SUMMARY

This application is intended to resolve at least one of the technical problems existing in the related art. Therefore, an objective of this application is to provide a power battery pack. The power battery pack has advantages of high space utilization, large energy density, long battery life, high reliability, low costs, high quality, and the like.

This application further provides an electric vehicle having the power battery pack.

An embodiment of a first aspect of this application provides a power battery pack, including: a pack body; and a plurality of cells, directly arranged in the pack body, where the cell extends from a first side of the pack body to a second side of the pack body, and the first side and the second side are disposed opposite to each other; and the first side of the pack body is provided with a first side wall, the second side of the pack body is provided with a second side wall, an end of the cell is supported by the first side wall, and the other end of the cell is supported by the second side wall.

In the power battery pack provided in this application, a plurality of cells are directly arranged in a pack body, removing various mounting structures through which a battery module is mounted in a conventional battery pack, which improves utilization of an internal space of the pack body, and increases a sum of volumes of the cells in the pack body. In other words, a ratio of volumes of the cells to a volume of the pack body is increased, and in a certain volume space, more cells are assembled, improving energy density of the power battery pack. In addition, an assembly process and procedures are simple, thereby reducing manpower, materials, and other costs. Moreover, the assembly procedures are reduced, so that a defective rate is reduced during assembly of the power battery pack, a possibility that the power battery pack becomes loose and is not mounted firmly is reduced, thereby improving quality of the power battery pack and stability and reliability of the battery pack. In addition, an end of the cell is supported by a first side wall, and the other end of the cell is supported by a second side wall. The cell itself is used as a supporting structure, and the cell is supported by the first side wall and the second side wall to support the gravity of the cell, so that various mounting structures through which a battery module is mounted in a conventional battery pack can be removed.

According to an embodiment of a second aspect of this application, an electric vehicle is provided. The electric vehicle includes the power battery pack according to the embodiment of the first aspect of this application.

According to the electric vehicle in the embodiments of this application, the power battery pack according to the embodiment of the first aspect this application is used, which can improve the battery life without expanding a battery occupation space.

REFERENCE NUMERALS

Figure 1:
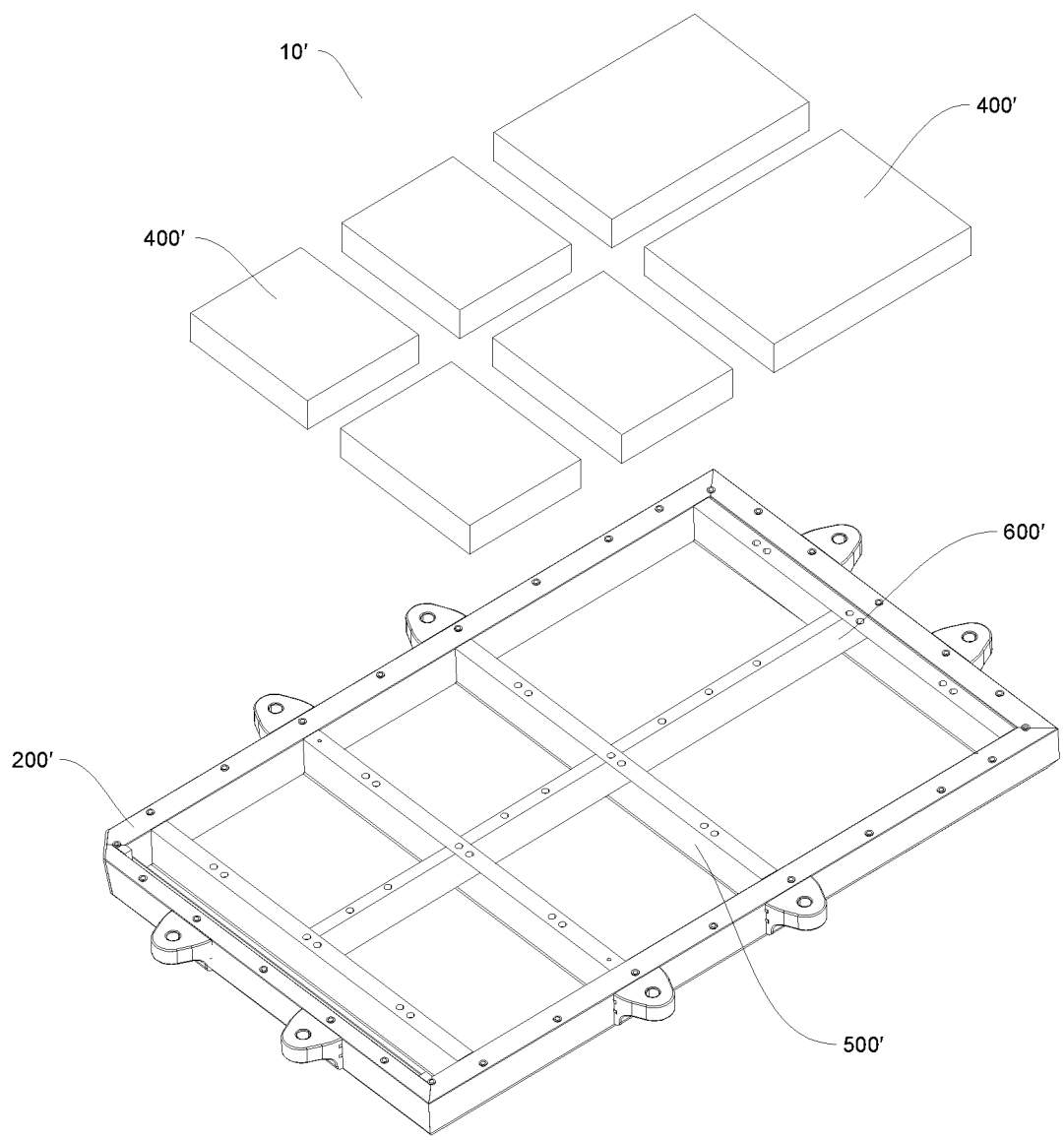
FIG. 1 is an exploded view of a power battery pack provided in the related art.

In the related art:
Power battery pack 10', pack body 200", battery module 400', lengthwise cross beam 600', and widthwise cross beam 500';

In this application:
Electric vehicle 1,
power battery pack 10,
cell 100, battery body 110, pack body 200, tray 210, upper cover 220, first side beam 201, second side beam 202, first end beam 203, second end beam 204, exhaust channel 222, air inlet 221,
battery array 400,
first terminal 101, second terminal 102, explosion-proof valve 103,
lengthwise cross beam 600, and widthwise cross beam 500,
length direction A of power battery pack 10, width direction B of power battery pack 10, height direction C of power battery pack 10,
length L of battery body 110, width H of battery body 110, thickness D of battery body 110, width W of vehicle body, and width F of pack body 200.

DETAILED DESCRIPTION

Embodiments of this application are described in detail below, and examples of the embodiments are shown in accompanying drawings, where the same or similar elements or the elements having same or similar functions are denoted by the same or similar reference numerals throughout the description. The embodiments described below with reference to the accompanying drawings are exemplary and used only for explaining this application, and should not be construed as a limitation on this application.

In the description of this application, it should be understood that orientation or position relationships indicated by the terms such as "vertical", "transverse", "length", "width", "thickness", "inside", and "outside" are based on orientation or position relationships shown in the accompanying drawings, and are used only for ease and brevity of illustration and description, rather than indicating or implying that the mentioned apparatus or element needs to have a particular orientation or needs to be constructed and operated in a particular orientation. Therefore, such terms should not be construed as limiting of this application.

In addition, in the description of this application, "a plurality of" means two or more than two.

In the related art, as shown in FIG. 1, a pack body 200" of a power battery pack 10' is mostly divided into mounting areas of a plurality of battery modules 400' by a widthwise cross beam 500' and a lengthwise cross beam 600'. For example, the battery module 400' of a battery pack disclosed in CN107925028A is fixed to the widthwise cross beam 500' and the lengthwise cross beam 600' by using screws or in another manner. The battery module 400' includes a plurality of cells arranged in sequence, the plurality of cells is arranged to form a battery array, and an end plate and/or side plate is disposed outside the battery array. Generally, the end plate and the side plate are included simultaneously and are fixed to enclose a space for accommodating the battery array. In addition, the end plate and the side plate are connected by using screws, or connected by using another connecting member such as a pull rod, to fix the battery array.

It is found through experiments and analysis that the battery module 400' is fixed to the widthwise cross beam 500' or the lengthwise cross beam 600' by using screws or another structure, which wastes a space, and increases weight because of addition of screws or another connecting member. In addition, the battery module 400' is designed through fitting of the end plate and the side plate. Both the end plate and the side plate have certain thicknesses and heights, wasting a space inside the pack body 200" and reducing volume utilization of the pack body 200". Generally, for the power battery pack 10' in the related art, a ratio of a sum of volumes of cells in the pack body 200" to a volume of the pack body 200" is about 50% or even lower to 40%.

By using the power battery pack 10' provided in the embodiments in the related art, the end plate and the side plate of the battery module 400', a connection manner and a mounting manner inside the power battery pack 10', and the like reduce utilization of an internal space of the pack body 200". Accordingly, in the power battery pack 10', a ratio of the sum of volumes of the cells to the volume of the pack body 200" is excessively low, and energy density of the power battery pack cannot meet the increasing demand of users for battery life of electric vehicles, which has gradually become an important factor hindering the development of the electric vehicles. In addition, an assembly process is cumbersome, and assembly procedures are complicated. First, the cells need to be assembled into a battery module and then the battery module is mounted in the pack body, increasing manpower, materials, and other costs. In addition, because a plurality of assembly procedures are needed, a probability of a defective rate is increased during assembly of the power battery pack. A plurality of assembly procedures increase a possibility that the power battery pack becomes loose and is not mounted firmly, causing an adverse effect on quality of the power battery pack, reducing stability and reliability of the power battery pack.

Considering a current situation of the power battery pack in the related art, this application provides a power battery pack and an electric vehicle having the power battery pack. The power battery pack has advantages of high space utilization, large energy density, long battery life, and the like.

An embodiment of a first aspect of this application provides a power battery back 10. The power battery pack 10 includes a pack body 200 and a plurality of cells 100.

The plurality of cells 100 are directly arranged in the pack body 200. The cell 100 extends from a first side of the pack body 200 to a second side of the pack body 200, and the first side and the second side are disposed opposite to each other. The first side and the second side are located at edges of the pack body 200.

For example, a length direction of the cell 100 extends along a width direction of the pack body 200, the first side is a side of the pack body 200 in the width direction of the pack body, and the second side is another side of the pack body 200 in the width direction of the pack body.

It needs to be understood herein that the "directly" in the "directly arranged" refers to that several cells 100 in the accommodating chambers are not assembled into battery modules in advance before mounted in the accommodating chambers. During the assembly, the several cells 100 are placed in the accommodating chambers, to implement mounting. For example, the end plate, the side plate, and other structures are not disposed in a battery array formed by cells 100 (for example, in the structure shown in FIG. 1, a battery module is first formed by cells, and then put into the pack body).

In the power battery pack 10 provided in this application, a plurality of cells 100 are directly arranged in a plurality of accommodating chambers in a pack body 200, removing various mounting structures through which a battery module is mounted in a conventional battery pack, which improves utilization of an internal space of the pack body, and increases a sum of volumes of the cells 100 in the pack body 200. In other words, a ratio of volumes of the cells 100 to a volume of the pack body 200 is increased, and in a certain volume space, more cells 100 are assembled, improving energy density of the power battery pack 10. In addition, an assembly process and procedures are simple, thereby reducing manpower, materials, and other costs. Moreover, the assembly procedures are reduced, so that a defective rate is reduced during assembly of the power battery pack 10, a possibility that the power battery pack becomes loose and is not mounted firmly is reduced, thereby improving quality of the power battery pack 10 and stability and reliability of the power battery pack 10.

The power battery pack 10 according to an embodiment of this application is described below with reference to the accompanying drawings.

As shown in FIG. 2 to FIG. 16, the power battery pack 10 according to this embodiment of this application includes a pack body 200 and a plurality of cells 100.

In some embodiments, for example, an industrial common structure of the pack body 200 includes a tray 210 and an upper cover 220. The tray 210 and the upper cover 220 jointly define an accommodating space for the plurality of cells 100. The plurality of cells 100 are disposed on the tray 210, and are covered by using the upper cover 220. In this embodiment, the tray 210 may be a box with an upper opening, and the upper cover 220 is in a flat plate shape, and is configured to seal the upper opening of the tray 210. In a common industrial solution, the tray 210 is a box with an upper opening, and the upper cover 220 is a box with a lower opening opposite to the tray. The upper opening of the tray 210 corresponds to the lower opening of the upper cover 220. During assembly, the upper opening of the tray aligns with the lower opening of the upper cover, to implement package of an internal accommodating space.

Certainly, in some special embodiments, for example, when an overall waterproof performance of the cell is relatively good, or the pack body is directly formed on the electric vehicle, the upper cover may not need to be disposed, and a battery array formed by several cells is supported only by using one tray. Even, in some embodiments, there is no need to provide a side beam or side edge on the periphery of the pack body, and the pack body is more like a flat plate without side edges. The cells are directly disposed on the flat plate. Alternatively, a cross beam is disposed on the flat plate, and then the cells are fixed by using the cross beam. More figuratively, the pack body may be imagined as a support that supports cells and through which a battery array formed by the cells is mounted on the electric vehicle, and there is no need to define the pack body as a complete pack body.

Figure 14:
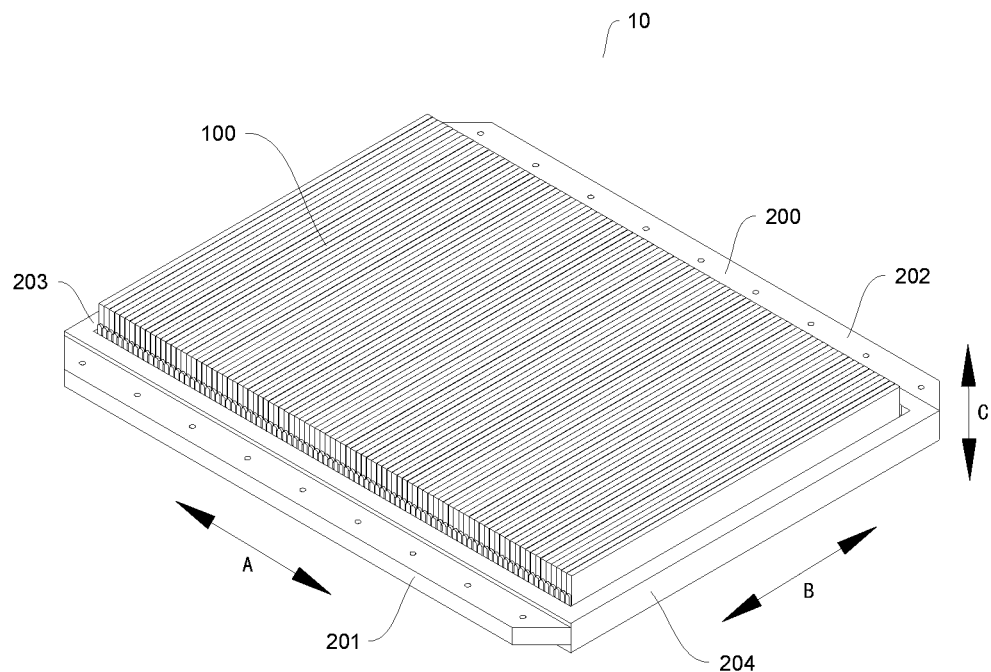
FIG. 14 is a three-dimensional diagram of a power battery pack according to a third optional embodiment of this application.
Figure 16:
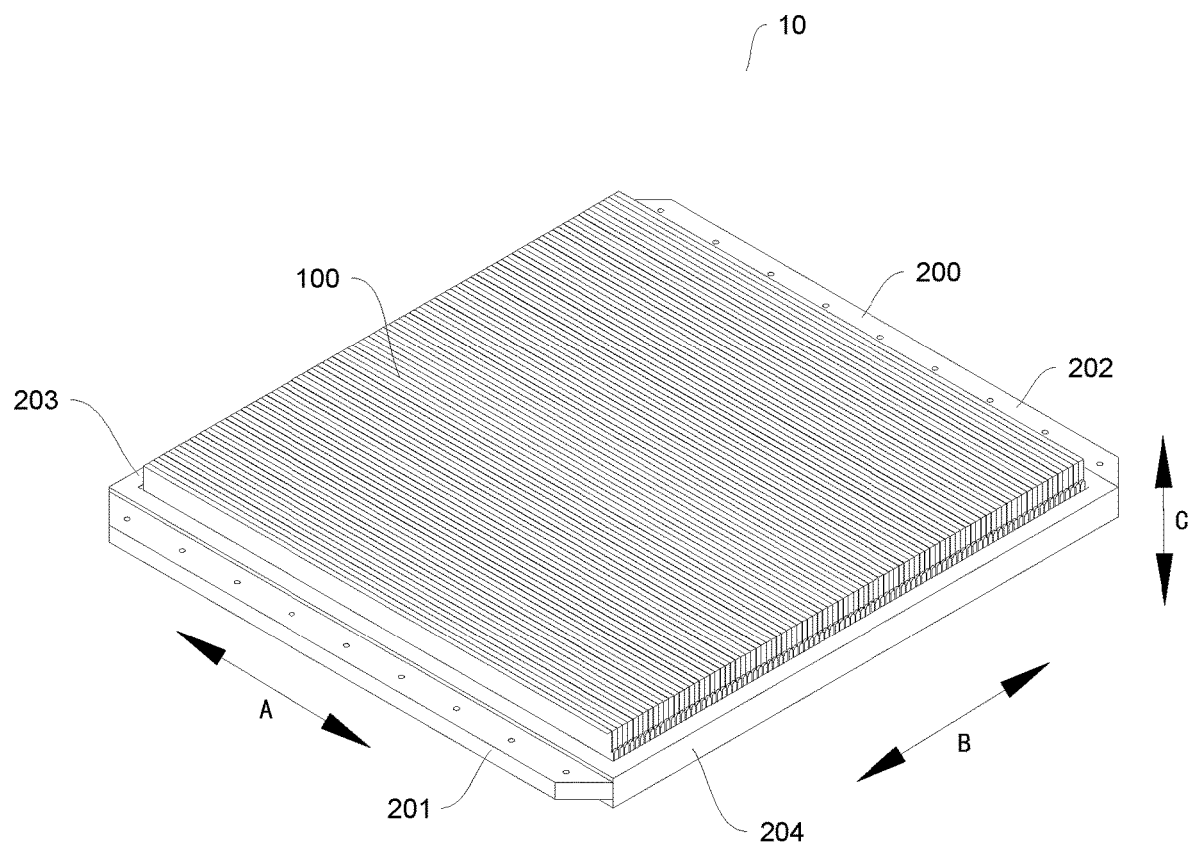
FIG. 16 is a three-dimensional diagram of a power battery pack according to a fifth optional embodiment of this application.

The plurality of cells 100 are disposed in the pack body 200. The pack body 200 may be understood as a housing configured to accommodate the plurality of cells 100, for example, may include a tray 210 and an upper cover 220. The tray 210 and the upper cover 220 jointly define an accommodating space for the plurality of cells 100. The plurality of cells 100 are disposed on the tray 210, and are covered by using the upper cover 220. The accommodating space is an overall space that is not divided. In other words, as shown in FIG. 14 and FIG. 16, neither a widthwise cross beam 500 extending along a width direction B of the pack power battery pack 10 nor a lengthwise cross beam 600 extending along a length direction A of the pack power battery pack 10 is disposed in the pack body 200, and end portions of the cell 100 in the length direction are supported by the pack body 200.

For example, the first side of the pack body 200 is provided with a first side wall, the second side of the pack body 200 is provided with a second side wall, an end of the cell 100 is supported by the first side wall, and the other end of the cell 100 is supported by the second side wall.

In some other embodiments of this application, the pack body 200 may alternatively include a base plate, and the cells 100 are supported by the base plate.

In some specific embodiments of this application, as shown in FIG. 2 to FIG. 16, the power battery pack 10 according to the embodiments of this application includes a pack body 200 and a plurality of cells 100.

The plurality of cells 100 are disposed in the pack body 200. The pack body 200 may be understood as a housing configured to accommodate the plurality of cells 100, for example, may include a tray 210 and an upper cover 220. The tray 210 and the upper cover 220 jointly define an accommodating space for the plurality of cells 100. The plurality of cells 100 are disposed on the tray 210, and are covered by using the upper cover 220. That is, the plurality of cells are disposed in the accommodating space. A sum $V1$ of volumes of the plurality of cells 100 and a volume $V0$ of the accommodating space meet: $81\% \leq V1/V0 \leq 97\%$.

A person skilled in the art may understand that, $V1$ is a product of volumes of the cells 100 and a quantity of the cells 100, and $V0$ is an actually remaining volume that is obtained by subtracting volumes of housings such as a tray base plate, four side edges on the periphery of the tray base plate, and the upper cover and a volume occupied by an internal battery management system and other power distribution modules from a total volume of the pack body 200 and that can accommodate the cells 100, the widthwise cross beam 500, and the lengthwise cross beam 600.

According to the power battery pack 10 in the embodiments of this application, an accommodating space is formed in the pack body 200, and the plurality of cells are directly arranged in the accommodating space; and a proportion of a sum of volumes of the cells 100 to a volume of the accommodating space is defined, that is, $81\% \leq V1/V0 \leq 97\%$, for example, $81\% \leq V1/V0 \leq 92\%$, so that the space utilization of the power battery pack 10 may be improved, and more cells 100 may be arranged in the power battery pack 10, that is, more energy providing structures are arranged in a unit space. Therefore, the energy density may be improved, thereby improving the battery life without expanding an occupation space.

In some specific examples of this application, as shown in FIG. 2 to FIG. 16, the power battery pack 10 according to the embodiments of this application includes a pack body 200 and a plurality of cells 100.

According to the power battery pack 10 in the embodiments of this application, a proportion of a length of the cell 100 to a size of a vehicle body in a length extending direction of the cell is defined, that is, $46\% \leq L0/X \leq 75\%$, so that more cells of the power battery pack may be arranged in a unit space of the vehicle body, that is, more energy providing structures are arranged in a unit space, to make full use of the space of the vehicle body. Therefore, the energy density may be improved, thereby improving the battery life without expanding an occupation space.

In some specific embodiments of this application, as shown in FIG. 2 to FIG. 16, the power battery pack 10 according to the embodiments of this application includes a pack body 200 and a plurality of cells 100.

The plurality of cells 100 are disposed in the pack body 200. The pack body 200 may be understood as a housing configured to accommodate the plurality of cells 100, for example, may include a tray 210 and an upper cover 220. The tray 210 and the upper cover 220 jointly define an accommodating space for the plurality of cells 100. The plurality of cells 100 are disposed on the tray 210, and are covered by using the upper cover 220, that is, disposed in the accommodating space. The accommodating space has a bottom surface, and the bottom surface is defined as a part of a bottom wall of the accommodating space. In a specific embodiment of this application, an accommodating space is formed in the pack body 200, and the plurality of cells are directly arranged in the accommodating space. A sum S1 of areas of orthographic projections of the plurality of cells 100 on the bottom surface and an area S0 of the bottom surface meet: $72\% \leq S1/S0 \leq 88\%$.

A person skilled in the art may understand that, S1 is a product of areas of orthographic projections of the cells 100 on the ground and a quantity of the cells 100, and S0 is an area of the bottom surface. It needs to be understood that the area of the bottom surface herein is an overall flat area of the bottom surface, and does not include surface areas of some concave-convex structures. In other words, it may be understood as an area of an orthographic projection of the bottom surface on the horizontal plane.

According to the power battery pack 10 in the embodiments of this application, a proportion of a sum of areas of orthographic projections of the cells 100 on the bottom surface to an area of the bottom surface is defined, that is, $72\% \leq S1/S0 \leq 88\%$, so that the space utilization of the power battery pack 10 may be improved, and more cells 100 may be arranged in the power battery pack 10, that is, more energy providing structures are arranged in a unit space. Therefore, the energy density may be improved, thereby improving the battery life without expanding an occupation space.

In some specific examples of this application, a sum V1 of volumes of the plurality of cells 100 and a volume V2 of the power battery pack 10 meet: $V1/V2 \geq 55\%$.

A person skilled in the art may understand that, V1 is a product of volumes of the cells 100 and a quantity of the cells 100, and V2 is an overall volume of a three-dimensional shape defined by an outer contour of the power battery pack 10, that is, a volume including an internal space of the power battery pack 10, that is, a volume of a three-dimensional region enclosed by the outer contour of the power battery pack 10 in space. V1/V2 may be defined as space utilization.

According to the power battery pack 10 in the embodiments of this application, a proportion of a sum of volumes of the cells 100 to a volume of the power battery pack 10 is defined, that is, $V1/V2 \geq 55\%$, so that the space utilization of the power battery pack 10 may be improved, and more cells 100 may be arranged in the power battery pack 10, that is, more energy providing structures are arranged in a unit space. Therefore, the energy density may be improved, thereby improving the battery life without expanding an occupation space.

In some embodiments of this application, a proportion of a sum V1 of volumes of the plurality of cells 100 to a volume V2 of the power battery pack 10 meets: $V1/V2 \geq 60\%$. In some other embodiments of this application, a proportion of the sum of the volumes of the plurality of cells 100 to the volume of the power battery pack 10 meets: $V1/V2 \geq 65\%$.

The power battery pack 10 according to the embodiments of this application and the battery pack disclosed in the Chinese patent No. CN107925028A are used as experiment objects, and both of the two use lithium iron phosphate (LPF) battery with a battery level being 73 kwh as an example. Because power distribution units (PDUs) need to be disposed in both the power battery pack and the battery pack, the two are compared through the disposed PDUs. It can be obtained through experiment that the space utilization of the power battery pack 10 according to the embodiments of this application is 62.5%, and the energy density is 281 wh/L; and the space utilization of the battery pack disclosed in the Chinese patent No. CN107925028A is 51%, and the energy density is 257 wh/L. Therefore, both the space utilization and the energy density of the battery pack disclosed in the Chinese patent No. CN107925028A are lower than that of the power battery pack 10 according to the embodiments of this application, and the battery life of the battery pack is also shorter than that of the power battery pack 10 according to the embodiments of this application.

A person skilled in the art may understand that, due to the influence of some factors, for example, peripheral parts and components, including a ball-strike preventing space at the bottom of the tray, a liquid cooling system, a thermal insulation material, an insulation protector, a thermal security accessory, a fire and gas discharge channel, and a high-voltage power distribution module, occupy the internal space of the pack body 200, a peak value of V1/V2 is usually 80%, that is, $V1/V2 \leq 80\%$.

The power battery pack 10 according to a specific embodiment of this application is described below with reference to the accompanying drawings. A length direction of the power battery pack 10 is indicated by using an arrow A, a width direction of the power battery pack 10 is indicated by using an arrow B, and a height direction of the power battery pack 10 is indicated by using an arrow C.

Figure 2:
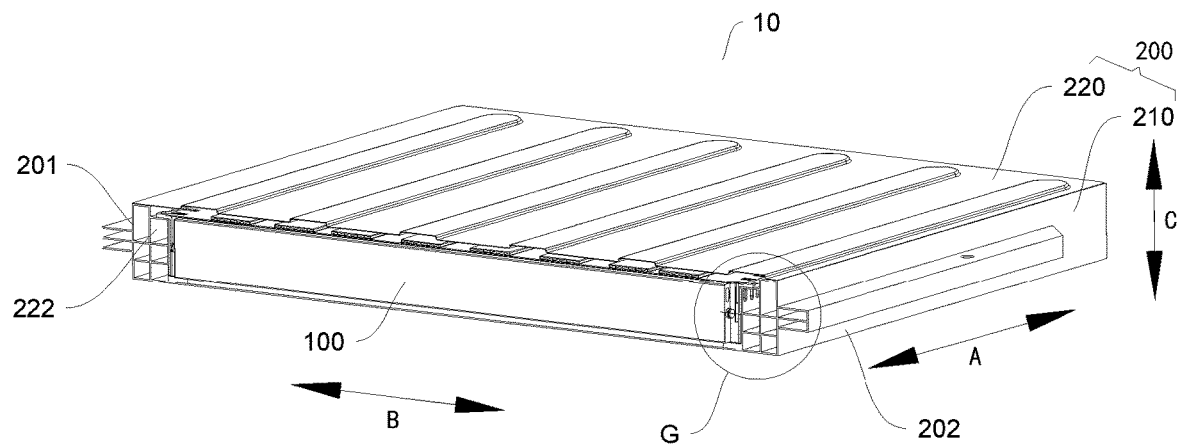
FIG. 2 is a cross-sectional view of a power battery pack according to an embodiment of this application.
Figure 3:
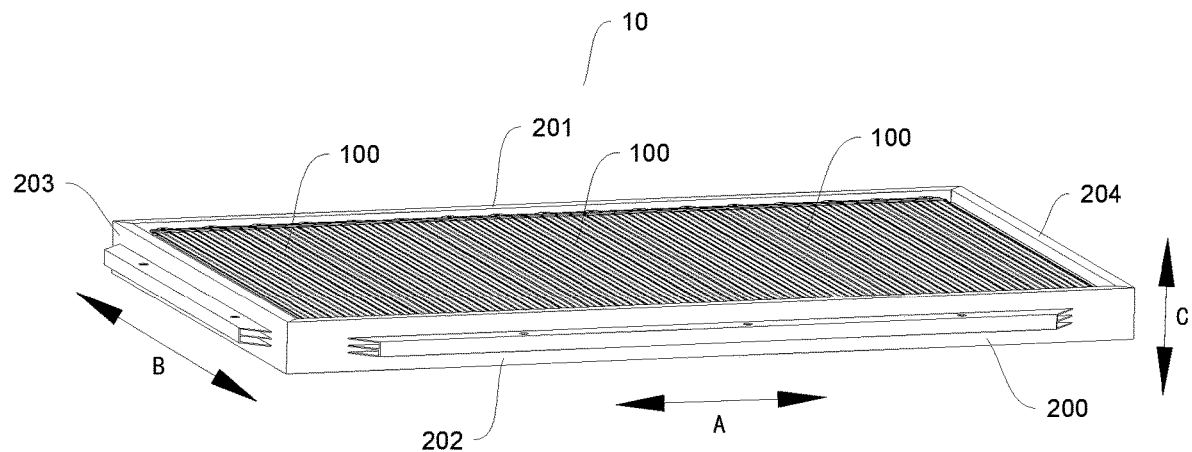
FIG. 3 is a three-dimensional diagram of a power battery pack according to an embodiment of this application.
Figure 4:
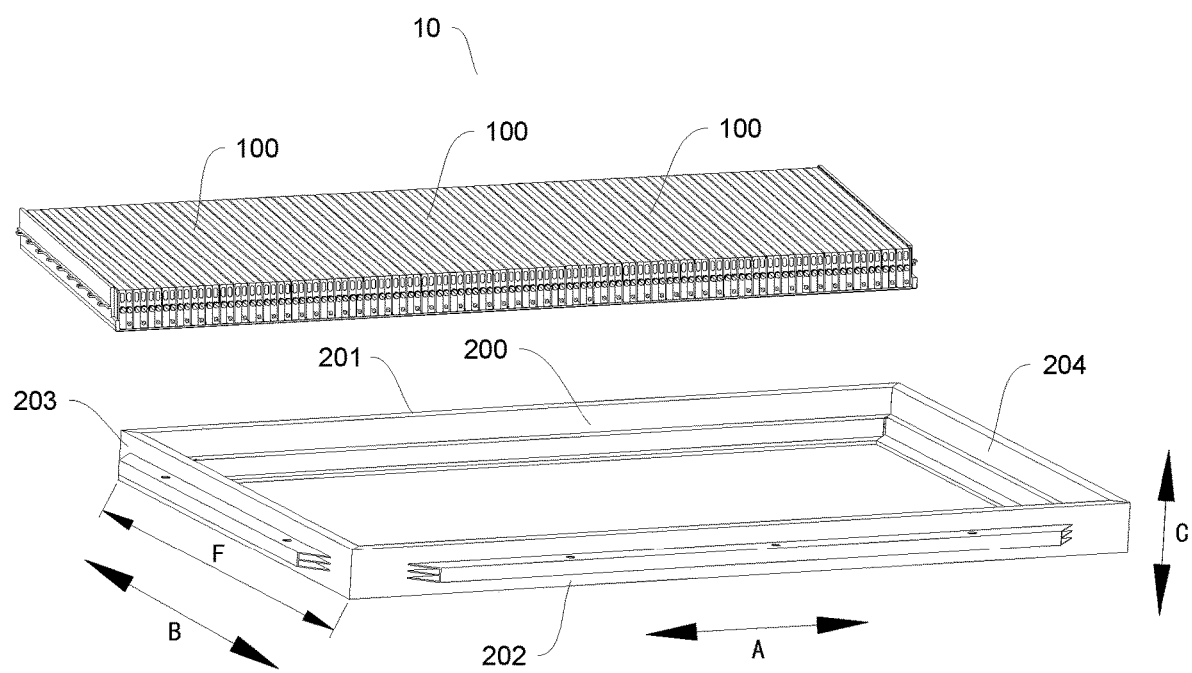
FIG. 4 is an exploded view of a power battery pack according to an embodiment of this application.

In some specific embodiments of this application, as shown in FIG. 2 to FIG. 4, the length direction of the cell 100 is arranged along the width direction B of the power battery pack 10, and the plurality of cells 100 are arranged along the length direction A of the power battery pack 10, facilitating in setting the space utilization of the power battery pack 10 to 55%, 60%, or a higher value.

In some specific examples of this application, as shown in FIG. 3 and FIG. 4, in the width direction B of the power battery pack 10, a total distance between the cell 100 and two neighboring side walls of the pack body 200 is less than a length of the cell 100. Specifically, in the width direction B of the power battery pack 10, a shortest distance between an end of the cell 100 and a side beam of the pack body 200 close to the end of the cell 100 is L1, a shortest distance between the other end of the cell 100 and a side beam of the pack body 200 close to the other end of the cell 100 is L2, and the length L0 of the cell 100 meets: $L1+L2<L0$. In this way, another additional cell 100 cannot be accommodated in the width direction B of the power battery pack 10.

In other words, only one cell 100 is accommodated in the pack body 200 in the width direction B of the power battery pack 10. That is, in the width direction B of the power battery pack 10, two or more cells 100 cannot be arranged in the direction.

It may be understood that two sides of the pack body 200 are side beams in the width direction B of the power battery pack 10, and two ends of the pack body 200 are end beams in the length direction A of the power battery pack 10.

In some specific examples of this application, as shown in FIG. 3 and FIG. 4, the length of the cell 100 extends in the entire width direction B of the power battery pack 10. That is, the cell 100 extends from one side to another side of the pack body 200 along the width direction B of the power battery pack 10, and the length of the cell 100 is filled in the width direction B of the power battery pack 10. Two or more cells 100 cannot be placed in the pack body 200 in the width direction B of the power battery pack 10, and two ends of the cell 100 in the length direction may fit two opposite side walls of the pack body 200 in the width direction B, for example, are fixed to the pack body 200. Therefore, no widthwise cross beam and lengthwise cross beam is needed inside the pack body 200, and connected cells 100 are directly serves as a reinforcing rib, to greatly simplify the structure of the pack body 200, and reduce a space occupied by the reinforcing rib and a space occupied by a mounting structure of the cell 100, thereby improving space utilization and battery life.

In some specific examples of this application, the pack body 200 includes side beams located at two sides in the width direction B of the power battery pack 10, and two ends of the cell 100 in the length direction are supported by the side beams; and the pack body 200 includes end beams located at two ends in the length direction A of the power battery pack 10, and the end beam provides an inward pressing force for cells 100 adjacent to the end beam.

As shown in FIG. 3 and FIG. 4, the pack body 200 includes a first side beam 201, a second side beam 202, a first end beam 203, and a second end beam 204. The first side beam 201, the first end beam 203, the second side beam 202, and the second end beam 204 are connected end to end sequentially. The first side beam 201 is opposite to the second side beam 202 in the width direction B of the power battery pack 10, and the first end beam 203 is opposite to the second end beam 204 in the length direction A of the power battery pack 10. The first side beam 201 and the second side beam 202 provide supporting forces for the two ends of the cell 100 in the length direction, that is, an end of the cell 100 is supported by the first side beam 201, and the other end of cell is supported by the second side beam 202. The first end beam 203 and the second end beam 204 provide pressing forces for two sides of cells 100 in a thickness direction. That is, the first end beam 203 applies a force, facing the second end beam 204, to cells 100 disposed adjacent to the first end beam 203, and the second end beam 204 applies a force, facing the first end beam 203, to cells 100 disposed adjacent to the second end beam 204, so that a plurality of cells 100 can be closely arranged between the first end beam 203 and the second end beam 204 along the length direction A of the power battery pack 10, and the plurality of cells 100 can be attached to each other. In addition, the first end beam 203 and the second end beam 204 may limit the plurality of cells 100 in the length direction A of the power battery pack 10. In particular, when the cells 100 slightly swell, the cells 100 can be buffered and provided with inward pressure to prevent the cells 100 from swelling and deforming excessively.

Figure 7:
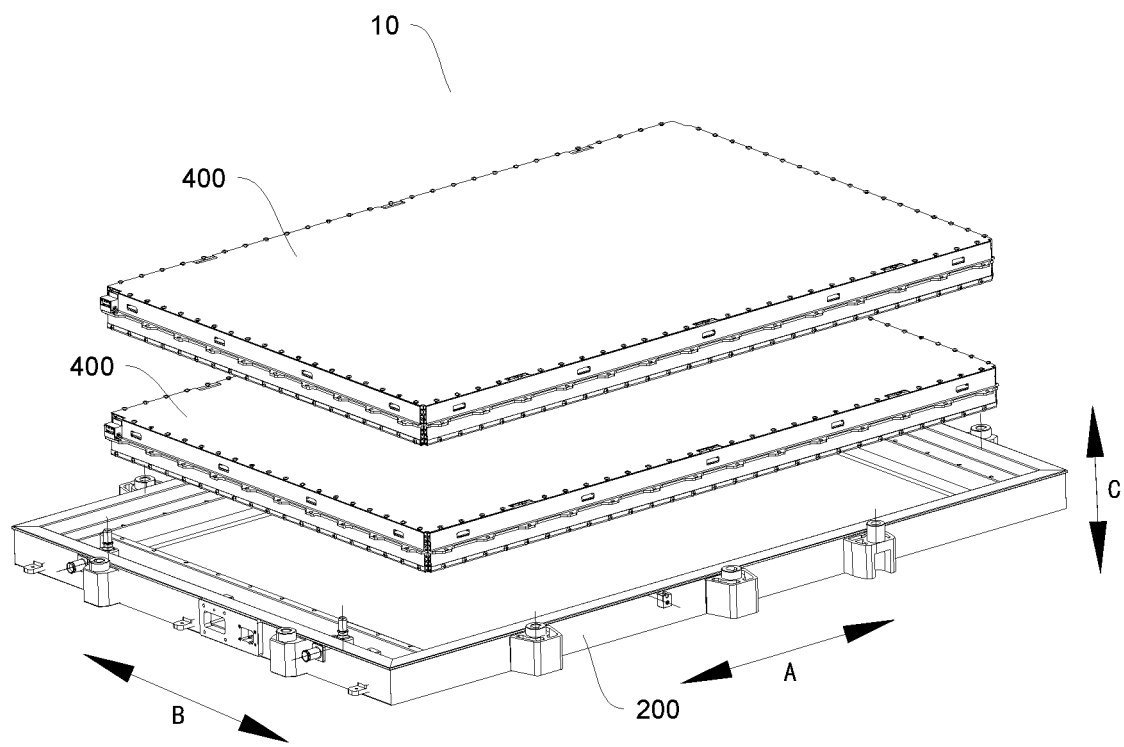
FIG. 7 is a schematic diagram of an arrangement manner of battery arrays of a power battery pack according to another embodiment of this application.

In some specific examples of this application, as shown in FIG. 7, the length direction of the cell 100 is arranged along the width direction B of the power battery pack 10, the plurality of cells 100 are arranged along the length direction A of the power battery pack 10 to form a battery array, and at least two layers of battery arrays are arranged in the pack body 200 along the height direction C of the power battery pack 10. Therefore, a quantity of the cells 100 is optimized, so that the space utilization is improved, to improve the energy density, and BIC and low-voltage sampling are easier to be integrated.

Figure 15:
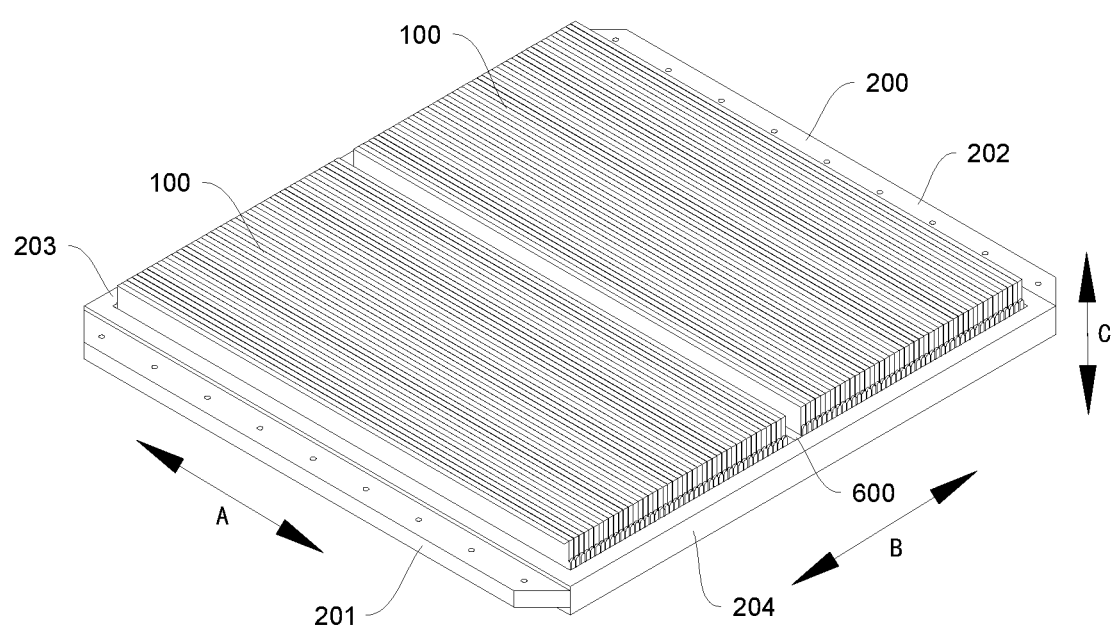
FIG. 15 is a three-dimensional diagram of a power battery pack according to a fourth optional embodiment of this application.

In some specific embodiments of this application, as shown in FIG. 15 and FIG. 16, the length direction of the cell 100 is arranged along the length direction A of the power battery pack 10, and the plurality of cells 100 are arranged along the width direction B of the power battery pack 10, facilitating in setting the space utilization of the power battery pack 10 to 50%, 60%, or a higher value.

In some specific examples of this application, as shown in FIG. 15 and FIG. 16, in the length direction A of the power battery pack 10, a total distance between the cell 100 and two neighboring end walls of the pack body 200 is less than the length of the cell 100. Specifically, in the length direction A of the power battery pack 10, a shortest distance between an end of the cell 100 and an end beam of the pack body 200 close to the end of the cell 100 is L3, a shortest distance between the other end of the cell 100 and an end beam of the pack body 200 close to the other end of the cell 100 is L4, and the length L0 of the cell 100 meets: L3+L4<L0. In this way, another additional cell 100 cannot be accommodated in the length direction A of the power battery pack 10.

In other words, only one cell 100 is accommodated in the pack body 200 in the length direction A of the power battery pack 10. That is, in the length direction A of the power battery pack 10, two or more cells 100 cannot be arranged in the direction.

It may be understood that, two sides of the pack body 200 are side beams in the width direction B of the power battery pack 10, and two ends of the pack body 200 are end beams in the length direction A of the power battery pack 10.

In some specific examples of this application, as shown in FIG. 15 and FIG. 16, the length of the cell 100 extends in the entire length direction A of the power battery pack 10. That is, the cell 100 extends from one end to the other end of the pack body 200 along the length direction A of the power battery pack 10, and the length of the cell 100 is filled in the length direction A of the power battery pack 10. Two or more cells 100 cannot be placed in the pack body 200 in the length direction A of the power battery pack 10, and two ends of the cell 100 in the length direction may fit two opposite end walls of the pack body 200 in the length direction A, for example, are fixed to the pack body 200. Therefore, no widthwise cross beam and lengthwise cross beam is needed inside the pack body 200, and connected cells 100 are directly serves as a reinforcing rib, to greatly simplify the structure of the pack body 200, and reduce a space occupied by the reinforcing rib and a space occupied by a mounting structure of the cell 100, thereby improving space utilization and battery life.

In some specific examples of this application, the pack body 200 includes end beams located at two ends in the length direction A of the power battery pack 10, and two ends of the cell 100 in the length direction are supported by the end beams; and the pack body 200 includes side beams located at two sides in the width direction B of the power battery pack 10, and the side beam provides an inward pressing force for cells 100 adjacent to the side beam.

As shown in FIG. 16, the pack body 200 includes a first side beam 201, a second side beam 202, a first end beam 203, and a second end beam 204. The first side beam 201, the first end beam 203, the second side beam 202, and the second end beam 204 are connected end to end sequentially. The first side beam 201 is opposite to the second side beam 202 in the width direction B of the power battery pack 10, and the first end beam 203 is opposite to the second end beam 204 in the length direction A of the power battery pack 10. The first end beam 203 and the second end beam 204 provide supporting forces for the two ends of the cell 100 in the length direction, that is, an end of the cell 100 is supported by the first end beam 203, and the other end of cell is supported by the second end beam 204. The first side beam 201 and the second side beam 202 provide pressing forces for two sides of cells 100 in a thickness direction. That is, the first side beam 201 applies a force, facing the second side beam 202, to cells 100 disposed adjacent to the first side beam 201, and the second side beam 202 applies a force, facing the first side beam 201, to cells 100 disposed adjacent to the second side beam 202, so that a plurality of cells 100 can be closely arranged between the first side beam 201 and the second side beam 202 along the width direction B of the power battery pack 10, and the plurality of cells 100 can be attached to each other. In addition, the first side beam 201 and the second side beam 202 may limit the plurality of cells 100 in the width direction B of the power battery pack 10. In particular, when the cells 100 slightly swell, the cells 100 can be buffered and provided with inward pressure to prevent the cells 100 from swelling and deforming excessively.

In some specific examples of this application, as shown in FIG. 15, the length direction of the cell 100 is arranged along the length direction A of the power battery pack 10, the plurality of cells 100 are arranged along the width direction B of the power battery pack 10, to form a battery array, and at least two layers of battery arrays are arranged in the pack body 200 along the height direction C of the power battery pack 10. Therefore, a quantity of the cells 100 is optimized, so that the space utilization is improved, to improve the energy density, and BIC and low-voltage sampling are easier to be integrated.

Figure 6:
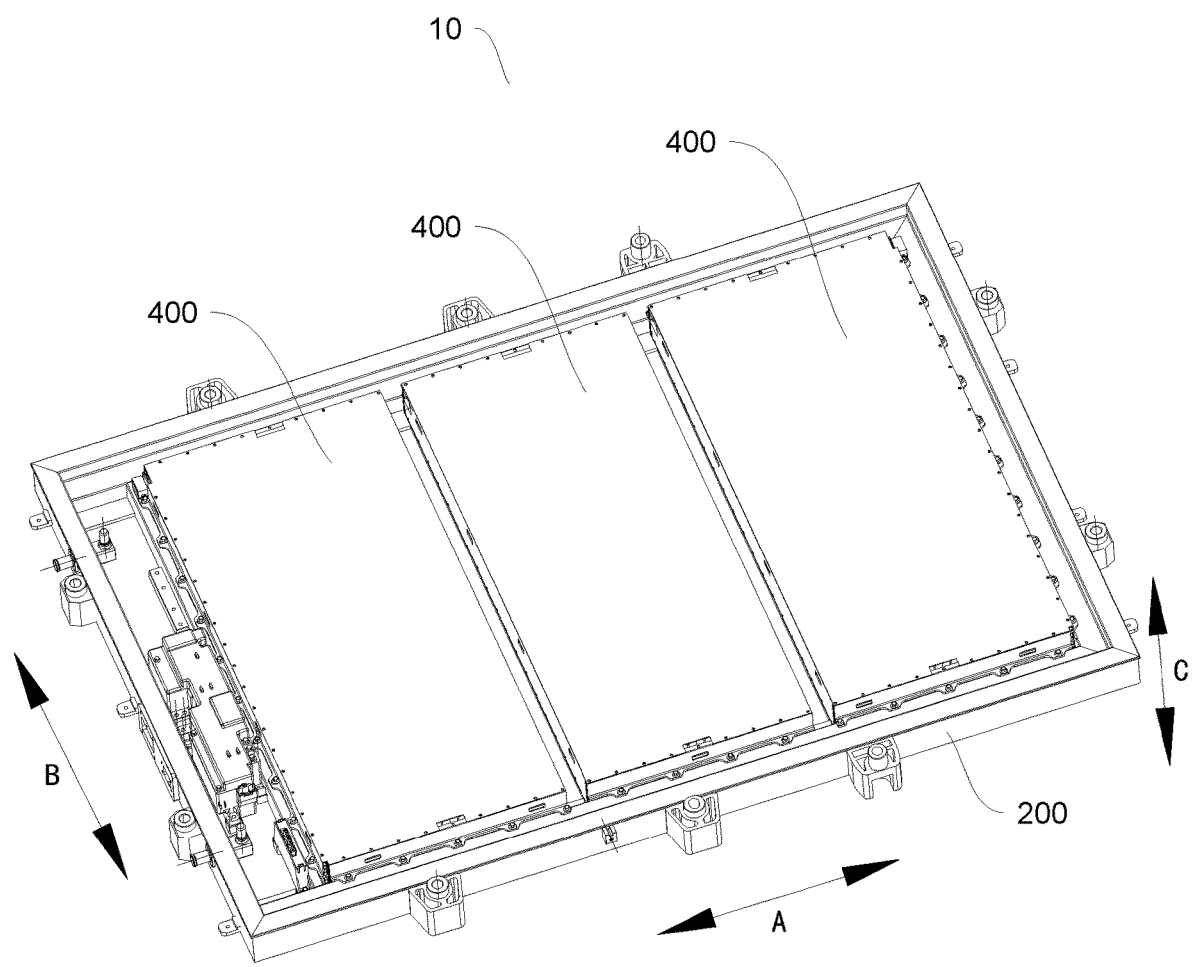
FIG. 6 is a schematic diagram of an arrangement manner of battery arrays of a power battery pack according to an embodiment of this application.

In some specific embodiments of this application, the plurality of cells 100 may be assembled into a plurality of battery arrays 400. The plurality of battery arrays 400 may be arranged along the length direction A of the power battery pack 10 (as shown in FIG. 6). Alternatively, the plurality of battery arrays 400 may be arranged along the width direction B of the power battery pack 10 (as shown in FIG. 15). Alternatively, the plurality of battery arrays 400 may be arranged along the height direction C of the power battery pack 10 to form a multi-layer structure (as shown in FIG. 7). In other words, regardless of whether the cell 100 extends along the width direction B or the length direction A of the power battery pack 10, the plurality of cells 100 may be arranged along the height direction C of the power battery pack 10 into multi layers. Certainly, the plurality of battery arrays 400 may be alternatively arranged along the length direction A and the height direction C of the power battery pack 10 simultaneously, or may be arranged along the width direction B and the height direction C of the power battery pack 10 simultaneously. Therefore, a quantity of the battery arrays 400 is optimized, so that the space utilization is improved, to improve the energy density, and BIC and low-voltage sampling are easier to be integrated. It needs to be understood that, end plates, side plates, or other structures are not disposed for the battery arrays 400 in the embodiments of this application.

In the related art, because the cell has a relatively small size and a relatively short length, two opposite ends of the cell cannot fit two side walls disposed opposite to each other in the pack body 200". Therefore, a lengthwise cross beam 600' and/or a widthwise cross beam 500' (as shown in FIG. 1) need to be disposed in the pack body 200", to facilitate assembly of the cell. When cells are mounted in the pack body 200" through a battery module 400', there are a plurality of cells along a width direction of the power battery pack 10'. In other words, the cell does not extend between the two opposite side walls, but extends between two opposite lengthwise cross beams 600' or widthwise cross beams 500'. The battery module is fixed to neighboring lengthwise cross beams 600' and/or widthwise cross beams 500' through a fastener.

Because in the related art, the pack body 200" is provided therein with the lengthwise cross beam 600' and/or the widthwise cross beam 500', the lengthwise cross beam 600' and/or the widthwise cross beam 500' occupy a large mounting space for accommodating cells in the pack body 200", resulting in relatively low space utilization of the pack body 200". Generally, a ratio of a sum of volumes of the cells to a volume of the pack body 200" is about 40% or even lower. In other words, in the related art, only about 40% of the space in the pack body 200" may be used for mounting the cells, resulting in a limited quantity of cells to be accommodated in the pack body 200", limiting a capacity and voltage of the entire power battery pack 10', and causing poor battery life of the power battery pack 10'.

According to the power battery pack 10 in the embodiments of this application, on one hand, the use of the lengthwise cross beam and/or the widthwise cross beam in the pack body 200 can be reduced, and even the lengthwise cross beam and/or the widthwise cross beam may not be disposed in the pack body 200, thereby reducing a space occupied by the lengthwise cross beam and/or the widthwise cross beam in the pack body 200, and improving the space utilization of the pack body 200; on the other hand, the use of the end plate and the side plate in the battery array 400 can be reduced, thereby reducing a space occupied by the end plate and the side plate in the pack body 200, and improving the space utilization of the pack body 200. More cells 100 can be arranged in the pack body 200, thereby improving the capacity, voltage, and battery life of the entire power battery pack.

In addition, because the lengthwise cross beam and/or the widthwise cross beam are not needed to be disposed in the pack body 200, on one hand, a manufacturing process of the pack body 200 is simplified, the assembly complexity of the cell 100 is reduced, and production costs are reduced; on the other hand, the weights of the pack body 200 and the entire power battery pack 10 are reduced, lightweight of the power battery pack 10 is achieved. In particular, when the power battery pack 10 is mounted on an electric vehicle, the battery life of the electric vehicle may be further improved, and lightweight of the electric vehicle is achieved.

Moreover, the cell 100 itself may be used for reinforcing the structural strength of the pack body 200. In other words, there is no need to further dispose a reinforcing structure in the pack body 200 to reinforce the structural strength of the pack body, and as a substitution of the reinforcing structure, the cell 100 may be directly used for ensuring the structural strength of the pack body 200, thereby ensuring that the pack body 200 is not easily deformed under the action of an external force. Compared with a battery pack disclosed in Chinese patent No. CN107925028A, the pack body 200 can not only accommodate and protect the cell 100, but also can support the cell 100, to improve the overall load-bearing capacity of the power battery pack 10, and the length of the cell 100 strengths the power battery pack 10. In addition, a surface area of a single cell 100 is increased, so that a heat dissipation area of the cell 100 may be increased. Therefore, the heat dissipation rate of the cell 100 is increased, thereby improving the security of the entire power battery pack 10, and making the power battery pack 10 safer and more reliable.

Figure 9:
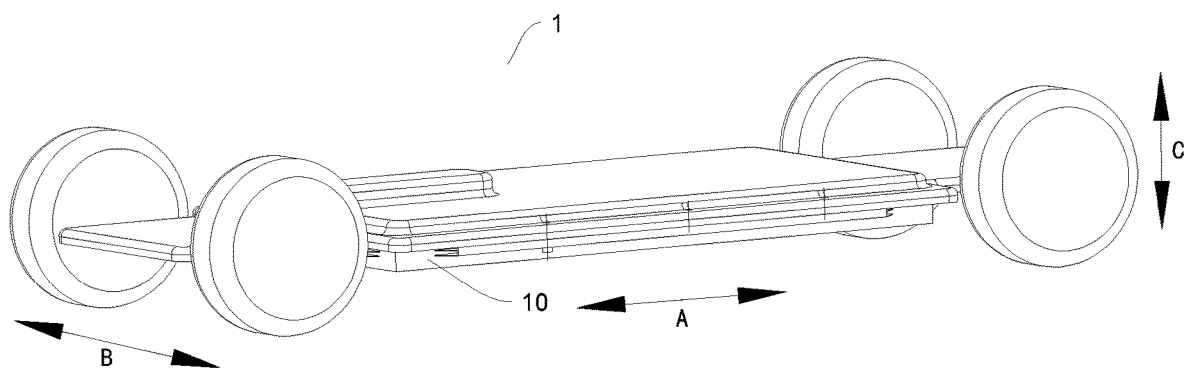
FIG. 9 is a schematic structural diagram of an electric vehicle according to an embodiment of this application.
Figure 10:
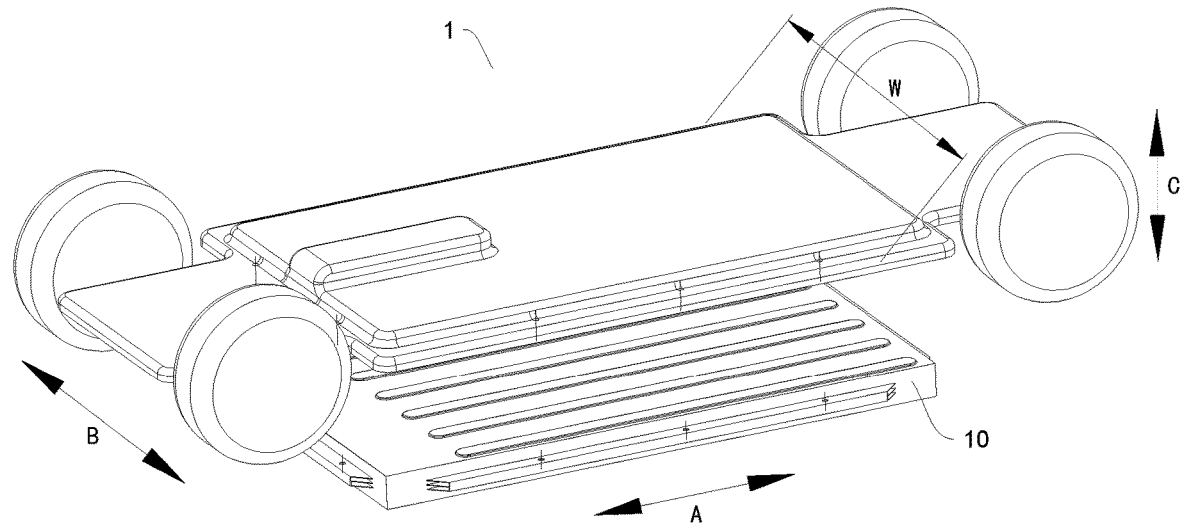
FIG. 10 is an exploded view of an electric vehicle according to an embodiment of this application.

In some specific embodiments of this application, as shown in FIG. 9 and FIG. 10, the pack body 200 is different from a battery pack housing disclosed in the Chinese patent No. CN107925028A, in particular, in terms of a size and load bearing. The pack body 200 may include a vehicle-use tray 210 connected to a vehicle body in a fitting manner, to form a structure that fit the vehicle or the vehicle body and that accommodates and carries the cells 100. The vehicle-use tray 210 is a tray that is separately produced and used for accommodating and mounting of the cells 100. When the cells 100 are mounted on the vehicle-use tray 210, the vehicle-use tray 210 may be mounted on the vehicle body through a fastener, for example, hanging on the chassis of the electric vehicle for accommodating and load bearing.

When the power battery pack 10 is used in a vehicle for providing electric energy, the length direction of the cell 100 may be arranged along a width direction of the vehicle body, that is, a left-right direction of the vehicle. In this case, a length L of the battery body 110 of the cell 100 may be 600 mm to 2500 mm, which may be selected to be 600 mm to 1500 mm, to enable the length of the cell 100 to fit a width of the vehicle.

Figure 8:
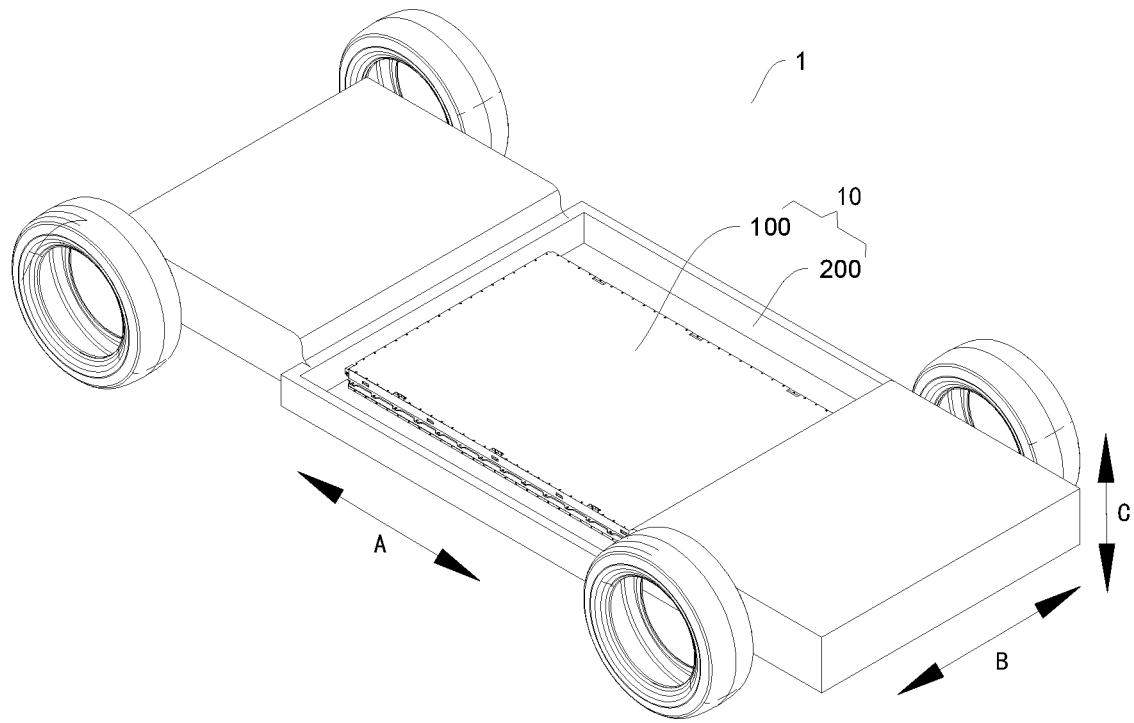
FIG. 8 is a schematic structural diagram of a pack body of a power battery pack being formed on an electric vehicle according to an embodiment of this application.

In some specific examples of this application, as shown in FIG. 8, the pack body 200 may be alternatively directly formed on the electric vehicle. In other words, the pack body 200 is a device that is formed at any appropriate position on the electric vehicle and in which the cell 100 is mounted. For example, the pack body 200 may be formed on the chassis of the electric vehicle.

In some specific embodiments of this application, when the power battery pack 10 is arranged on the electric vehicle, different from the battery pack disclosed in the Chinese patent No. CN107925028A, the power battery pack 10 further includes at least one of a battery management system (BMS), a battery connector, a battery sampler, and a battery thermal management system, or other components required by a vehicle-use battery. The width direction B of the power battery pack 10 is arranged along a width direction of a vehicle body, that is, a left-right direction of the vehicle, and the length direction of the power battery pack 10 is arranged along a length direction of the vehicle body, that is, a front-rear direction of the vehicle. Certainly, this application is not limited thereto. The width direction B of the power battery pack 10 may be alternatively arranged along the length direction of the vehicle body, and the length direction A of the power battery pack 10 may be arranged along the width direction of the vehicle body.

A person skilled in the art may understand that, arrangement of a direction of the cells 100 in the power battery pack 10 and arrangement of a direction of the power battery pack 10 on the electric vehicle may be combined in different manners. For example, the length direction of the cell 100 may be arranged along the width direction B of the power battery pack 10, or may be arranged along the length direction A of the power battery pack 10; and the width direction B of the power battery pack 10 may be arranged along the width direction of the vehicle body, or may be arranged along the length direction of the vehicle body. In another example, regardless of whether the width direction B of the power battery pack 10 is arranged along the width direction of the vehicle body or the length direction of the vehicle body, the length direction of the cell 100 is arranged along the width direction of the vehicle body. Relative arrangement directions of the cell 100, the power battery pack 10, and the vehicle body may be set according to actual applications, to meet different requirements.

The cell 100 according to an embodiment of this application is described below with reference to the accompanying drawings.

In the following specific embodiments, a length L, a width H, and a thickness D are all measured in millimeter (mm), a surface area S is measured in square millimeter ($mm^2$), a volume V is measured in cubic millimeter ($mm^3$), and energy E is measured in watt per hour (Wh).

Figure 5:
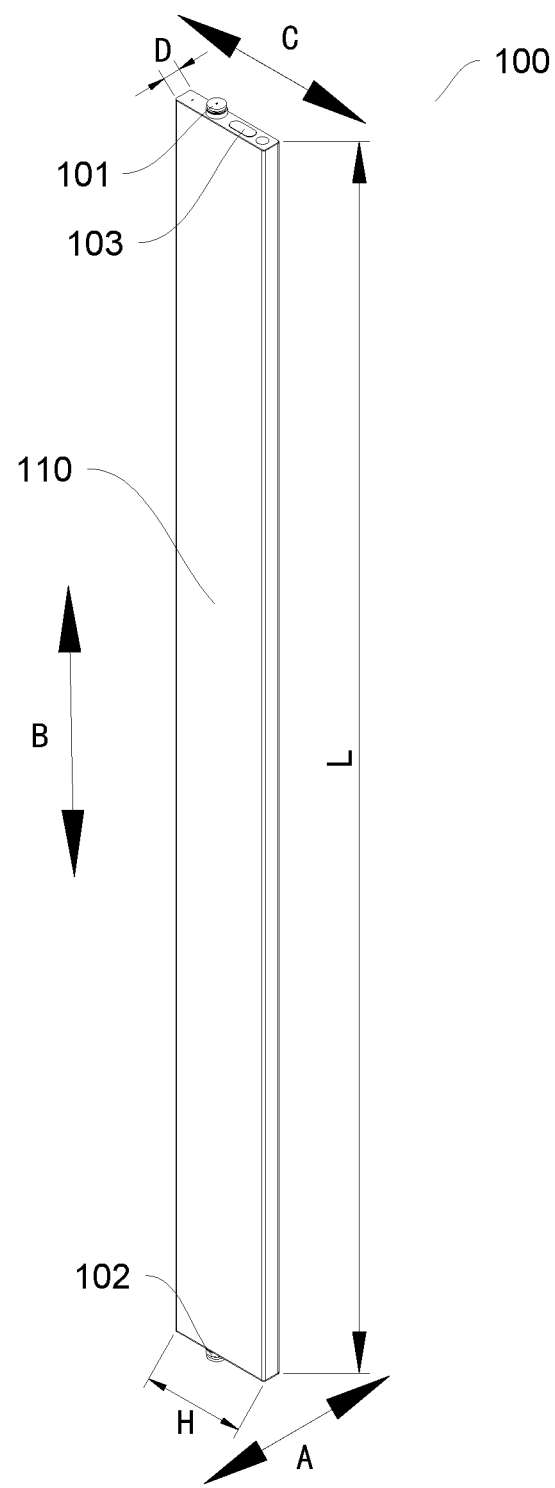
FIG. 5 is a schematic structural diagram of a cell according to an embodiment of this application.

As shown in FIG. 5, the cell 100 according to this embodiment of this application includes a battery body 110. It may be understood that, the battery body 110 is a main portion in addition to small-sized protrusion structures such as a tab). The battery body 110 has a length L, a width H, and a thickness D.

The length L of the battery body 110 is greater than the width H of the battery body 110, the width H of the battery body 110 is greater than the thickness D of the battery body 110, and the length L of the battery body 110 and the width H of the battery body 110 meet: $L/H=4$ to 20, and may be selected to be 9 to 13.

During development of the electric vehicle, a requirement on a voltage platform of the cell is pre-determined. In this way, a volume of the cell is a fixed value. That is, in a case that a voltage platform is achieved, based on the use of the same chemical system material, a quantity of materials accommodated in the cell is fixed. Therefore, the volume is a fixed. According to the cell 100 in this embodiment of this application, by designing a ratio of the length L to the width H of the battery body 110, the battery body 110 may be reasonably flattened and elongated under a certain volume. On one hand, it facilitates overall arrangement in the power battery pack (for example, implementing the arrangement of the power battery pack 10 according to the foregoing embodiments of this application), thereby improving the space utilization of the power battery pack, expanding the energy density of the power battery pack, and further prolonging the battery life of the power battery pack; on the other hand, it can be ensured that the cell 100 has a sufficiently large heat dissipation area, and can promptly conduct heat inside the cell to the outside, to prevent the heat from gathering inside the cell, thereby matching relatively high energy density, and supporting the improvement of the battery life.

To optimize the arrangement of the cells 100 in the power battery pack, and improve the heat dissipation capacity of the cells 100, the length L and the thickness D of the battery body 110 meet: $L/D=23$ to 200.

In some specific embodiments of this application, as shown in FIG. 5, the battery body 110 is a cuboid structure with a smooth outer surface, which has certain structural strength. For example, a pole core of a battery is inputted into a square battery housing, an opening portion of the battery housing is sealed by using a cover plate, and an electrolyte solution is injected. Compared with a battery with an aluminum-plastic compound film, a heat-conducting property of the cell 100 according to this embodiment of this application is good, and a conventional battery thermal management structure is also used, which can effectively avoid the heat dissipation problem brought by a large-size structure. Compared with a cylindrical cell, the space utilization is higher, and the process of production and assembly is easier.

When the cells 100 according to this embodiment of this application are arranged in the pack body 200 of the power battery pack 10, a length direction and a thickness direction of the battery body 110 may extend along a horizontal direction, and a width direction of the battery body 110 may extend along a vertical direction, that is, the cells 100 are placed sideways. Both the horizontal direction and the vertical direction are subject to a direction of the power battery pack 10 during use (for example, when the power battery pack is applied to the electric vehicle).

In some specific examples of this application, to improve the energy density and the battery life by optimizing the arrangement of the cells 100 in the power battery pack 10, other parameters of the cell 100 are designed, to enable the arrangement of the battery body 110 to be compact and energy to be more concentrated in the limited space of the pack body 200.

For example, the length L of the battery body 110 and a volume V of the battery body 110 meet: L/V=0.0005 to 0.002 $mm^{-2}$, the width H of the battery body 110 and the volume V of the battery body 110 meet: H/V=0.0001 to 0.00015 $mm^{-2}$, and the thickness D of the battery body 110 and the volume V of the battery body 110 meet: D/V=0.0000065 to 0.00002 $mm^{-2}$. Therefore, for the battery body 110 with a certain volume, a proportion of each of the length L, the width H, and the thickness D to the volume V is designed, to optimize the distribution of energy per unit quantity in the space, thereby facilitating the arrangement in the pack body 200.

The length L of the battery body 110 and a surface area S of the battery body 110 meet: L/S=0.002 to 0.005 $mm^{-1}$, and the length L of the battery body 110 and energy E of the battery body 110 meet: L/E=0.8 to 2.45 $mm \cdot Wh^{-1}$, and may be selected to be: L/E=1.65 to 2.45 $mm \cdot Wh^{-1}$. In this way, it facilitates that the cell 100 crosses two opposite sides of the pack body 200 in the length direction of the cell, to improve the battery life of the power battery pack 10, and maintain the structural strength and the heat dissipation effect of the cell 100.

In some other examples of this application, the surface area S of the battery body 110 and the volume V of the battery body 110 meet: S/V=0.1 to 0.35 $mm^{-1}$. Therefore, not only a sufficient heat dissipation area is ensured, to ensure a heat dissipation effect, but also a volume proportion of the cells 100 may be reduced, facilitating compact arrangement of the plurality of cells 100 in the power battery pack 10.

The surface area S of the battery body 110 and the energy E of the battery body 110 meet: S/E≤1000 $mm \cdot Wh^{-1}$. In this way, it can be ensured that the surface of the cell 100 has a sufficient heat dissipation area, and in particular, when the battery uses a ternary or high-nickel ternary cathode material, the heat inside the battery can be promptly conducted, facilitating safety of the battery. In addition, the cell 100 in this embodiment of this application is a square battery having a smooth outer surface, certain structural strength, and a good metal heat conducting performance. Compared with a battery of which a surface area is increased by setting corrugation, the process and subsequent assembly has a relatively small difficulty.

In some specific embodiments of this application, as shown in FIG. 5, the cell 100 further includes a first terminal 101 and a second terminal 102.

The first terminal 101 is disposed on an end of the battery body 110 in the length direction of the battery body, and the second terminal 102 is disposed on the other end of the battery body 110 in the length direction of the battery body. In other words, the length direction of the cell 100 may be a current direction inside the cell 100, that is, the current direction inside the cell 100 is shown as the arrow B. In this way, because the current direction is the same as the length direction of the cell 100, the cell 100 has a larger effective heat dissipation area and better heat dissipation efficiency. The first terminal 101 is connected to an anode tab of the cell 100, and the second terminal 102 is connected to a cathode tab of the cell 100. Alternatively, the first terminal 101 is connected to a cathode tab of the cell 100, and the second terminal 102 is connected to an anode tab of the cell 100.

In some specific examples of this application, as shown in FIG. 5, the cell 100 further includes an explosion-proof valve 103.

The explosion-proof valve 103 is disposed on at least one end of the battery body 110 in the length direction of the battery body. When the cell 100 has a fault and swells, sufficient air pressure is generated inside the cell to break through a flip sheet in the explosion-proof valve 103, thereby short-circuiting the cell 100, ensuring safety of the cell 100, and preventing the cell 100 from exploding.

A person skilled in the art may understand that, the setting of the explosion-proof valve 103 may be not only applied to a battery with an aluminum housing, but also may be applied to a pouch battery. In addition, the explosion-proof valve 103 may be alternatively disposed at other positions than an end portion of the battery body 100.

In some specific embodiments of this application, two ends of the battery body 110 along the length direction of the battery body are each provided with an explosion-proof valve 103, and the explosion-proof valves 103 at the two ends of the battery body 110 discharge gas through different exhaust channels 222.

Figure 11:
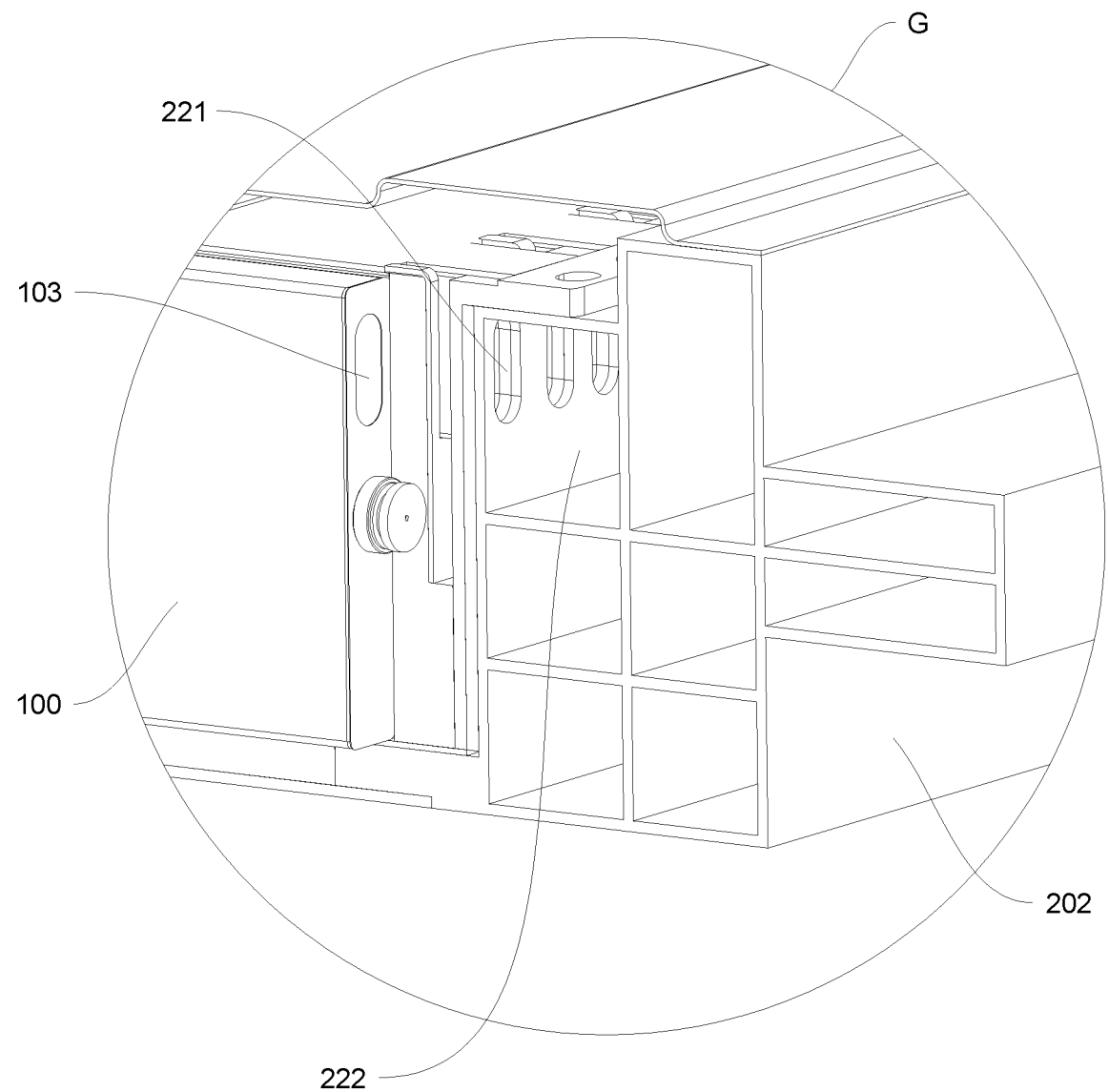
FIG. 11 is an enlarged view of a region G in FIG. 2.

For example, as shown in FIG. 2, FIG. 5 and FIG. 11, an explosion-proof valve 103 is disposed on a first end of the cell 100 facing the first side beam 201, the first side beam 201 is provided therein with an exhaust channel 222, the first side beam 201 is provided with an air inlet 221 at a position corresponding to the explosion-proof valve 103 of each cell 100, the air inlet 221 is in communication with the exhaust channel 222, and the pack body 200 is provided with an exhaust hole in communication with the exhaust channel 222; and/or an explosion-proof valve 103 is disposed on a second end of the cell 100 facing the second side beam 202, the second side beam 202 is provided therein with an exhaust channel 222, the second side beam 202 is provided with an air inlet 221 at a position corresponding to the explosion-proof valve 103 of each cell 100, the air inlet 221 is in communication with the exhaust channel 222, and the pack body 200 is provided with an exhaust hole in communication with the exhaust channel 222.

In the related art, during use of the cell, if the air pressure inside the cell increases to a certain degree, the explosion-proof valve is opened. Flame, smoke, or gas inside the cell is exhausted through the explosion-proof valve. The flame, smoke, or gas gathers inside the power battery pack and causes secondary damage to the cell if not exhausted in time. In the embodiments of this application, because the first side beam 201 and/or the second side beam 202 are provided with the air inlet 221 corresponding to the explosion-proof valve 103 of each cell 100, and the first side beam 201 and/or the second side beam 202 are provided therein with the exhaust channel 222, when the air pressure inside the cell 100 increases, the explosion-proof valve 103 of the cell is opened. Flame, smoke, or gas inside the cell directly enters the exhaust channel 222 in the first side beam 201 and/or the second side beam 202 through the air inlet 221, and is discharged from the first side beam 201 and/or the second side beam 202 through the exhaust hole, for example, discharged into the atmosphere through the exhaust hole. In this way, the flame, smoke or gas does not gather inside the pack body 200, to prevent the flame, smoke or gas from causing secondary damage to the cell 100.

In addition, an end of each of the plurality of cells 100 discharges gas through the exhaust channel 222 in the first side beam 201, and the other end of each of the plurality of cells 100 discharges gas through the exhaust channel 222 in the second side beam 202. Therefore, two ends of the cell 100 discharge gas through different channels, which increases a gas discharging distance, and discharges gas in a cross manner, thereby reducing the temperature.

An electric vehicle 1 according to an embodiment of this application is described below with reference to the accompanying drawings. The electric vehicle may include electric vehicles that need a power battery pack to provide electric energy for driving the electric vehicles, such as a commercial vehicle, a special vehicle, an electric bicycle, an electric motorcycle, and an electric scooter.

As shown in FIG. 9 and FIG. 10, the electric vehicle 1 according to this embodiment of this application includes the power battery pack 10 according to the foregoing embodiments of this application. The pack body 200 may be integrally formed on the electric vehicle. Alternatively, the pack body 200 may be a vehicle-use tray that is separately produced and used for accommodating and mounting of the cells 100.

In the electric vehicle 1 according to this embodiment of this application, the power battery pack 10 according to the foregoing embodiments of this application is used, which can improve the battery life without expanding a battery occupation space.

In some specific embodiments of this application, as shown in FIG. 9 and FIG. 10, the power battery pack 10 is disposed at the bottom of the electric vehicle 1, and the pack body 200 is fixedly connected to a chassis of the electric vehicle 1. Because the chassis of the electric vehicle 1 has a relatively large mounting space, as many as cells 100 may be accommodated by disposing the power battery pack 10 on the chassis of the electric vehicle 1, thereby improving the battery life of the electric vehicle 1.

In some specific examples of this application, as shown in FIG. 9 and FIG. 10, the electric vehicle 1 includes one power battery pack 10 disposed at the bottom of the electric vehicle 1, and the pack body 200 is fixedly connected to a chassis of the electric vehicle 1. A width direction of the power battery pack 10 is arranged along a width direction of a vehicle body of the electric vehicle 1, that is, a left-right direction of the electric vehicle 1, and a length direction of the power battery pack 10 is arranged along a length direction of the vehicle body of the electric vehicle 1, that is, a front-rear direction of the electric vehicle 1. In another embodiment, the electric vehicle 1 may include a plurality of power battery packs 10 disposed at the bottom of the electric vehicle 1. The plurality of power battery packs 10 may have the same or different shapes and sizes. Each power battery pack 10 may be adjusted according to a shape and size of the chassis of the electric vehicle 1, and the plurality of power battery packs 10 are arranged along the length direction of the vehicle body, that is, the front-rear direction.

In some specific examples of this application, a ratio of a width F of the pack body 200 to a width W of the vehicle body meets: $50\% \leq F/W \leq 80\%$. In this embodiment, the ratio may be achieved by disposing only one pack body 200 along the width direction of the vehicle body. When there are a plurality of pack bodies 200, the plurality of pack bodies 200 are arranged along the length direction of the vehicle body.

Usually, for most vehicles, the width W of the vehicle body is 500 mm to 2000 mm, for example, 500 mm, 1600 mm, 1800 mm, and 2000 mm, and the length of the vehicle body is 500 mm to 5000 mm. For a passenger vehicle, a width of the passenger vehicle is usually 500 mm to 1800 mm, and a length of the vehicle body is 500 mm to 4000 mm.

In some other embodiments of this application, a width F of the pack body 200 is 500 mm to 1500 mm, which is much greater than that of the battery pack housing disclosed in the Chinese patent No. CN107925028A, to facilitate in accommodating the battery array 400 of the battery pack in the patent No. CN107925028A, thereby ensuring the battery life, and matching the size of the vehicle body.

In some specific examples of this application, the cell 100 includes a battery body 110, and a ratio of a length L of the battery body 110 to a width W of the vehicle body meets: $46\% \leq L/W \leq 76\%$. In this embodiment, the ratio may be achieved by disposing only one cell 100 along the width direction of the vehicle body. In other possible implementations, in a case that such a dimension requirement is met, the ratio may be achieved by disposing a plurality of battery arrays 400 or a plurality of cells 100 in the length direction. In some embodiments, the length L of the battery body 110 is 400 mm to 1500 mm.

Other configurations and operations of the cell 100, the power battery pack 10, and the electric vehicle 1 according to the embodiments of this application are known to a person of ordinary skill in the art and are not be described in detail herein.

Description is performed below through Comparative example 1 and Embodiments 1 to 3, Comparative example 2 and Embodiments 4 and 5, and Comparative example 3 and Embodiments 6 and 7. According to the power battery pack 10 in the embodiments of this application, energy density and the like are improved through design of arrangement and a dimension parameter, and the like of the cell 100.

The embodiments and comparative examples below all use a lithium iron phosphate battery with a battery level being 73 kwh as an example.

In Comparative example 1 and Embodiments 1 to 3, a total volume of the power battery pack is 213 L, a length of the pack body is 1380, a width is 1005, and a thickness is 13. A sum of a volume of the housing such as a tray and an upper cover and a volume occupied by the internal battery management system and other power distribution modules is 58 L. An actual remaining volume that can accommodate cells and/or a widthwise cross beam or a lengthwise cross beam is 155 L.

Comparative Example 1

For the power battery pack 10' in the related art, as shown in FIG. 1, the pack body 200" is provided therein with two widthwise cross beams 500' and one lengthwise cross beam 600'. The two widthwise cross beams 500' and the lengthwise cross beam 600' divide cells into six battery modules 400', each of the battery modules 400' having a battery pack housing.

Embodiment 1

Figure 12:
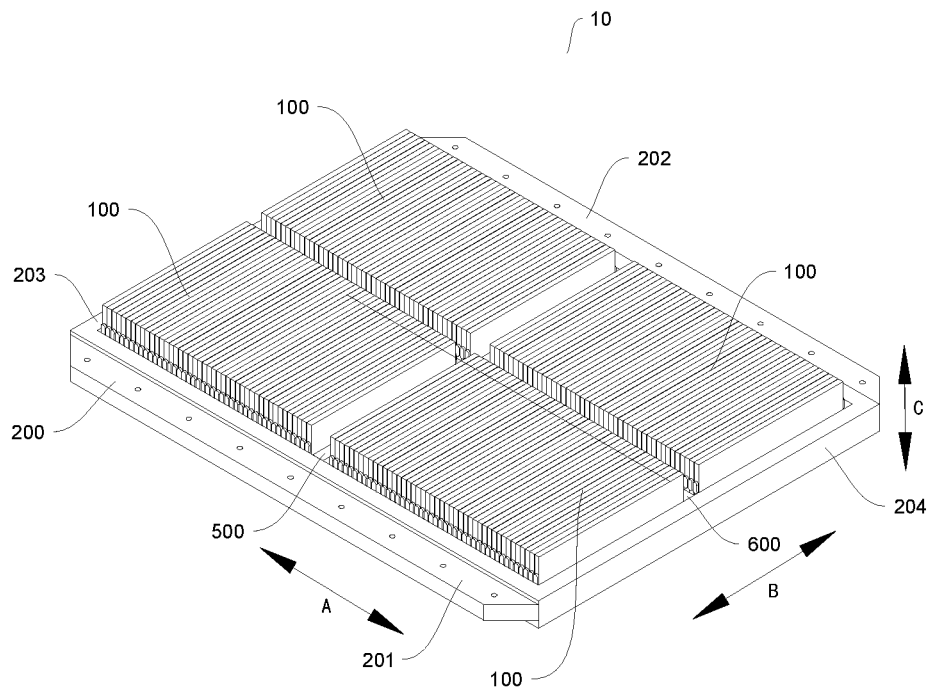
FIG. 12 is a three-dimensional diagram of a power battery pack according to a first optional embodiment of this application.

According to the power battery pack 10 in this embodiment of this application, as shown in FIG. 12, a length direction of the cell 100 is arranged along the width direction B of the power battery pack, the plurality of cells 100 are arranged along the length direction A of the power battery pack 10, and in the width direction B of the power battery pack, the pack body 200 accommodates two cells 100. The pack body 200 is provided therein with one widthwise cross beam 500 and one lengthwise cross beam 600, and the widthwise cross beam 500 extends along the width direction B of the power battery pack 10. The plurality of cells 100 are arranged along the length direction A of the power battery pack 10 to form a battery array, and the widthwise cross beam 500 divides the battery array into at least two parts along the length direction A of the power battery pack 10. In addition, for the plurality of cells 100, two rows of battery arrays are disposed along the width direction B of the power battery pack. The lengthwise cross beam 600 is located between two neighboring rows of battery arrays. A first beam 201 and a second beam 202 located at two sides of the pack body 200 in the width direction B of the power battery pack 10 provide supporting forces for the cells 100. A third beam 203 and a fourth beam 204 located at two ends of the pack body 200 in the length direction A of the power battery pack 10 provide inward pressing forces for cells 100 adjacent to thereof. Neither an end plate nor a side plate is disposed for the battery array of the power battery pack 10.

Embodiment 2

Figure 13:
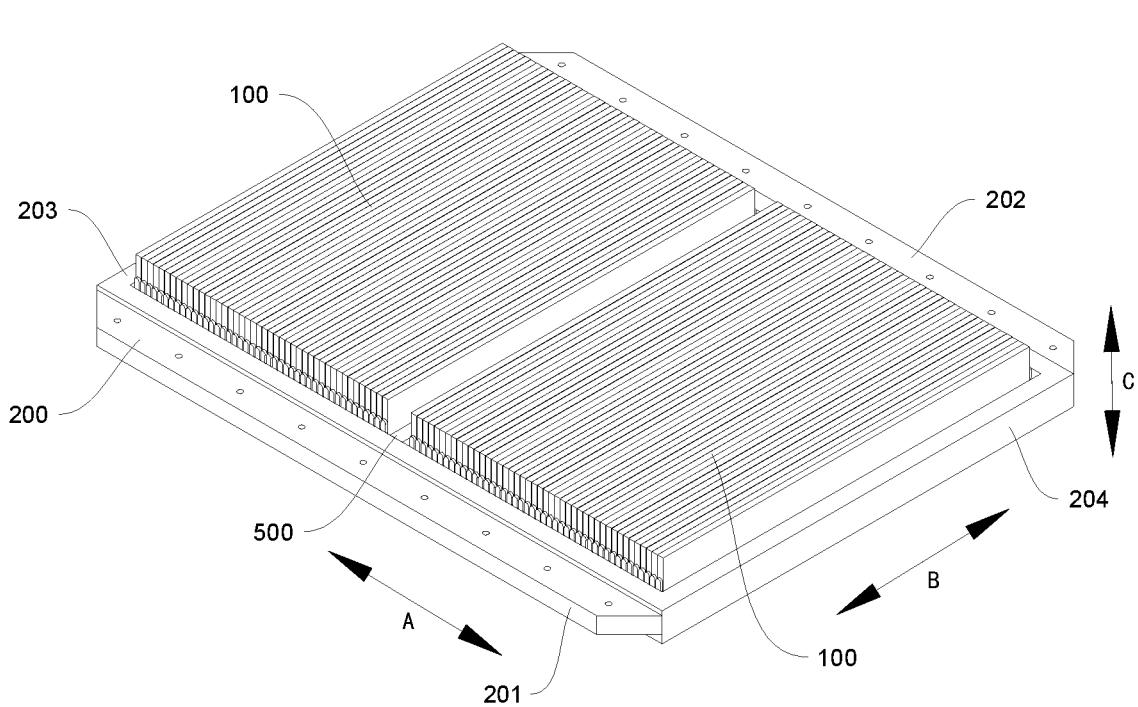
FIG. 13 is a three-dimensional diagram of a power battery pack according to a second optional embodiment of this application.

According to the power battery pack 10 in this embodiment of this application, as shown in FIG. 13, a length direction of the cell 100 is arranged along the width direction B of the power battery pack, the plurality of cells 100 are arranged along the length direction A of the power battery pack 10. In the width direction B of the power battery pack, the pack body 200 accommodates one cell 100, and the cell 100 extends from one side to another side of the pack body 200 in the width direction B of the power battery pack 10. The pack body 200 is provided therein with one widthwise cross beam 500 and no lengthwise cross beam 600, and the widthwise cross beam 500 extends along the width direction B of the power battery pack 10. The plurality of cells 100 are arranged along the length direction A of the power battery pack 10 to form a battery array, and the widthwise cross beam 500 divides the battery array into at least two parts along the length direction A of the power battery pack 10. A first beam 201 and a second beam 202 located at two sides of the pack body 200 in the width direction B of the power battery pack 10 provide supporting forces for the cells 100. A third beam 203 and a fourth beam 204 located at two ends of the pack body 200 in the length direction A of the power battery pack 10 provide inward pressing forces for cells 100 adjacent to thereof. Neither an end plate nor a side plate is disposed for the battery array of the power battery pack 10.

Embodiment 3

According to the power battery pack 10 in this embodiment of this application, as shown in FIG. 14, a length direction of the cell 100 is arranged along the width direction B of the power battery pack, the plurality of cells 100 are arranged along the length direction A of the power battery pack 10. In the width direction B of the power battery pack, the pack body 200 accommodates one cell 100, and the cell 100 extends from one side to another side of the pack body 200 in the width direction B of the power battery pack 10. Neither the widthwise cross beam 500 nor the lengthwise cross beam 600 is disposed in the pack body 200. A first beam 201 and a second beam 202 located at two sides of the pack body 200 in the width direction B of the power battery pack 10 provide supporting forces for the cells 100. A third beam 203 and a fourth beam 204 located at two ends of the pack body 200 in the length direction A of the power battery pack 10 provide inward pressing forces for cells 100 adjacent to thereof. Neither an end plate nor a side plate is disposed for the battery array of the power battery pack 10.

It may be known by a person skilled in the art by comparing the foregoing Comparative example 1 and Embodiments 1 to 3 that, compared with the power battery pack 10' in the related art, for the power battery pack 10 according to the embodiments of this application, the space utilization can break through a limit of an existing power battery pack through design of arrangement, size parameters, and other factors of the cell 100, to achieve greater energy density.

In Comparative example 2 and Embodiments 4 and 5, a total volume of the power battery pack is 310 L, a length of the pack body is 1580, a width is 1380, and a thickness is 137. A sum of a volume of the housing such as a tray and an upper cover and a volume occupied by the internal battery management system and other power distribution modules is 89 L. An actual remaining volume that can accommodate cells and/or a widthwise cross beam or a lengthwise cross beam is 221 L.

Comparative Example 2

For the power battery pack 10' in the related art, as shown in FIG. 1, the pack body 200'' is provided therein with two widthwise cross beams 500' and one lengthwise cross beam 600'. The two widthwise cross beams 500' and the lengthwise cross beam 600' divide cells into six battery modules 400', each of the battery modules 400' having a side plate and an end plate.

Embodiment 4

According to the power battery pack 10 in this embodiment of this application, as shown in FIG. 15, a length direction of the cell 100 is arranged along the length direction A of the power battery pack, the plurality of cells 100 are arranged along the width direction B of the power battery pack 10. In the length direction A of the power battery pack, the pack body 200 accommodates one cell 100, and the cell 100 extends from one side to another side of the pack body 200 in the length direction A of the power battery pack 10. The pack body 200 is provided therein with one lengthwise cross beam 600 and no widthwise cross beam 500, and the lengthwise cross beam 600 extends along the length direction A of the power battery pack 10. The plurality of cells 100 are arranged along the width direction B of the power battery pack 10 to form a battery array, and the lengthwise cross beam 600 divides the battery array into two parts along the width direction B of the power battery pack 10. A third beam 203 and a fourth beam 204 located at two ends of the pack body 200 in the length direction A of the power battery pack 10 provide supporting forces for the cells 100. A first beam 201 and a second beam 202 located at two sides of the pack body 200 in width direction B of the power battery pack 10 provide inward pressing forces for cells 100 adjacent to thereof. Neither an end plate nor a side plate is disposed for the battery array of the power battery pack 10.

Embodiment 5

According to the power battery pack 10 in this embodiment of this application, as shown in FIG. 16, a length direction of the cell 100 is arranged along the length direction A of the power battery pack, the plurality of cells 100 are arranged along the width direction B of the power battery pack 10. In the length direction A of the power battery pack, the pack body 200 accommodates one cell 100, and the cell 100 extends from one side to another side of the pack body 200 in the length direction A of the power battery pack 10. Neither the widthwise cross beam 500 nor the lengthwise cross beam 600 is disposed in the pack body 200. A third beam 203 and a fourth beam 204 located at two ends of the pack body 200 in the length direction A of the power battery pack 10 provide supporting forces for the cells 100. A first beam 201 and a second beam 202 located at two sides of the pack body 200 in width direction B of the power battery pack 10 provide inward pressing forces for cells 100 adjacent to thereof. Neither an end plate nor a side plate is disposed for the battery array of the power battery pack 10.

In Comparative example 3 and Embodiment 6, a total volume of the power battery pack is 414 L, a length of the pack body is 2130, a width is 1380, and a thickness is 137. A sum of a volume of the housing such as a tray and an upper cover and a volume occupied by the internal battery management system and other power distribution modules is 58 L. An actual remaining volume that can accommodate cells and/or a widthwise cross beam or a lengthwise cross beam is 312 L.

In Embodiment 7, a total volume of the power battery pack is 508 L, a length of the pack body is 2630, a width is 1380, and a thickness is 137. A sum of a volume of the housing such as a tray and an upper cover and a volume occupied by the internal battery management system and other power distribution modules is 119 L. An actual remaining volume that can accommodate cells and/or a widthwise cross beam or a lengthwise cross beam is 389 L.

Comparative Example 3

For the power battery pack 10' in the related art, as shown in FIG. 1, the pack body 200'' is provided therein with two widthwise cross beams 500' and one lengthwise cross beam 600'. The two widthwise cross beams 500' and the lengthwise cross beam 600' divide cells into six battery modules 400', each of the battery modules 400' having a battery pack housing.

Embodiment 6 and Embodiment 7

According to the power battery pack 10 in this embodiment of this application, as shown in FIG. 16, a length direction of the cell 100 is arranged along the length direction A of the power battery pack, the plurality of cells 100 are arranged along the width direction B of the power battery pack 10. In the length direction A of the power battery pack, the pack body 200 accommodates one cell 100, and the cell 100 extends from one side to another side of the pack body 200 in the length direction A of the power battery pack 10. Neither the widthwise cross beam 500 nor the lengthwise cross beam 600 is disposed in the pack body 200. A third beam 203 and a fourth beam 204 located at two ends of the pack body 200 in the length direction A of the power battery pack 10 provide supporting forces for the cells 100. A first beam 201 and a second beam 202 located at two sides of the pack body 200 in width direction B of the power battery pack 10 provide inward pressing forces for cells 100 adjacent to thereof. Neither an end plate nor a side plate is disposed for the battery array of the power battery pack 10.

Specific parameters of Embodiments 1 to 7 and Comparative examples 1 to 3 are shown in Table 1.

TABLE 1

| | Comparative example 1 | Embodiment 1 | Embodiment 2 | Embodiment 3 | Comparative example 2 | Embodiment 4 | Embodiment 5 | Comparative example 3 | Embodiment 6 | Embodiment 7 |
|---|---|---|---|---|---|---|---|---|---|---|
| Size of a cell: length, width, and height | 208 * 118 * 13.5 | 435 * 118 * 13.5 | 905 * 118 * 13.5 | 905 * 118 * 13.5 | 208 * 118 * 13.5 | 1280 * 118 * 13.5 | 1280 * 118 * 13.5 | 208 * 118 * 13.5 | 2000 * 118 * 13.5 | 2500 * 118 * 13.5 |
| Quantity | 352 | 176 | 88 | 92 | 500 | 90 | 93 | 752 | 94 | 94 |
| Capacity (Ah) of the cell | 47.5 | 95 | 202 | 202 | 47.5 | 286 | 286 | 47.5 | 448 | 561 |
| Battery level (Wh) of the cell | 152 | 304 | 646.4 | 646.4 | 152 | 915.2 | 915.2 | 152 | 1434 | 1795 |
| Volume (L) of the cell | 0.331 | 0.693 | 1.442 | 1.442 | 0.331 | 2.039 | 2.039 | 0.331 | 3 | 4 |
| Volume (L) of an accommodating chamber of the cell | 150 | 151 | 152 | 155 | 219 | 220 | 221 | 334 | 356 | 389 |
| Cell VED (Wh/L) | 459 | 439 | 448 | 448 | 459 | 449 | 449 | 459 | 450 | 451 |
| Size (mm) of a vehicle body in an extending direction of the cell | 1880 | 1880 | 1880 | 1880 | 1950 | 1950 | 1950 | 4700 | 4700 | 5200 |
| Area (mm$^2$) of orthographic projections of the cell at a base plate | 988416 | 1033560 | 1075140 | 1124010 | 1404000 | 1555200 | 1607040 | 2111616 | 2538000 | 3172500 |

TABLE 1-continued

| | Comparative example 1 | Embodiment 1 | Embodiment 2 | Embodiment 3 | Comparative example 2 | Embodiment 4 | Embodiment 5 | Comparative example 3 | Embodiment 6 | Embodiment 7 |
|---|---|---|---|---|---|---|---|---|---|---|
| Total area (mm²) of the base plate | 1386900 | 1386900 | 1386900 | 1386900 | 2180400 | 2180400 | 2180400 | 2939400 | 2939400 | 3629400 |
| Battery level (Wh) of Pack | 53504 | 53504 | 56883.2 | 59468.8 | 76000 | 82368 | 85113.6 | 114304 | 134758.4 | 168748.8 |
| Total volume (L) of Pack | 213 | 213 | 213 | 213 | 310 | 310 | 310 | 414 | 414 | 508 |
| Energy density (Wh/L) of Pack | 251 | 252 | 268 | 280 | 245 | 266 | 275 | 276 | 326 | 332 |
| Space utilization (%) | 54.76% | 57.39% | 59.70% | 62.41% | 53.49% | 59.25% | 61.23% | 60.23% | 72.39% | 73.66% |
| Total volume of the cell/Volume of the accommodating chamber of the cell | 77.76% | 80.77% | 83.46% | 85.57% | 75.65% | 83.42% | 85.81% | 74.63% | 84.13% | 96.33% |
| Length of the cell/Width of the vehicle body along the extending direction of the cell | 44.26% | 46.28% | 48.14% | 48.14% | 42.67% | 65.64% | 65.64% | 35.40% | 42.55% | 48.08% |
| Total area of the orthographic projections of the cell at the base plate/Area of the base plate | 71.27% | 74.52% | 77.52% | 81.04% | 64.39% | 71.33% | 73.70% | 71.84% | 86.34% | 87.41% |

It may be known by a person skilled in the art by comparing the foregoing Comparative example 1 and Embodiments 1 to 3 that, compared with the power battery pack 10' in the related art, for the power battery pack 10 according to the embodiments of this application, the space utilization can break through a limit of an existing power battery pack through design of arrangement, size parameters, and other factors of the cell 100, to achieve greater energy density.

It may be known by a person skilled in the art by comparing the foregoing Comparative example 2 to Embodiments 4 and 5, and Comparative example 3 to Embodiments 6 and 7 that, for the power battery pack 10 according to the embodiments of this application, the space utilization can break through a limit of an existing power battery pack through design of arrangement, size parameters, and other factors of the cell 100, to achieve greater energy density. In addition, the increase in energy density is magnified as an overall volume of the power battery pack is increased. In other words, for a power battery pack with a larger volume, energy density is more significantly improved by using the solution of the embodiments of this application.

In the description of this specification, description of reference terms such as "a specific embodiment" or "a specific example", means including specific features, structures, materials, or features described in the embodiment or example in at least one embodiment or example of this application. In this specification, exemplary descriptions of the foregoing terms do not necessarily refer to the same embodiment or example.

Although the embodiments of this application have been shown and described, a person of ordinary skill in the art should understand that various changes, modifications, replacements and variations may be made to the embodiments without departing from the principles and spirit of this application, and the scope of this application is as defined by the appended claims and their equivalents.

What is claimed is:

1. A power battery pack, comprising:
    a pack body comprising a first side wall and a second side wall opposite to the first side wall; and
    a plurality of cells, directly arranged in the pack body, wherein:
        one of the plurality of cells comprises a battery body, a first electrical terminal connected to a first electrode tab and disposed at a first end of the battery body, and a second electrical terminal connected to a second electrode tab and disposed at a second end of the battery body;
        the one of the plurality of cells extends from the first side wall to the second side wall; and
        the first end of the battery body is supported by the first side wall, and the second end of the battery body is supported by the second side wall.

2. The power battery pack according to claim 1, wherein a length direction of the one of the plurality of cells extends along a width direction of the pack body, the first side wall is disposed on a side of the pack body in the width direction of the pack body, and the second side wall is disposed on another side of the pack body in the width direction of the pack body.

3. The power battery pack according to claim 1, wherein a sum V1 of volumes of the plurality of cells and a volume V2 of the power battery pack meet: V1/V≥55%.

4. The power battery pack according to claim 3, wherein V1/V≥60%.

5. The power battery pack according to claim 1, wherein an accommodating space is formed in the pack body, and the plurality of cells are directly arranged in the accommodating space; and
 a sum V1 of volumes of the plurality of cells and a volume V0 of the accommodating space meet: 81%≤V1/V0≤97%.

6. The power battery pack according to claim 1, wherein an accommodating space is formed in the pack body, and the plurality of cells are directly arranged in the accommodating space; and
 the accommodating space has a bottom surface, and a sum S1 of areas of orthographic projections of the plurality of cells on the bottom surface and an area S0 of the bottom surface meet: 72%≤S1/S0≤88%.

7. The power battery pack according to claim 1, wherein a length direction of the one of the plurality of cells is in parallel with a width direction of the power battery pack, and the plurality of cells are arranged along a length direction of the power battery pack; and
 only one cell is accommodated in the pack body in the width direction of the power battery pack.

8. The power battery pack according to claim 1, wherein a length direction of the one of the plurality of cells is in parallel with a width direction of the power battery pack, and the plurality of cells are arranged along a length direction of the power battery pack; and
 in the width direction of the power battery pack, a shortest distance between the first end of the battery body and a side beam of the pack body close to the first end of the battery body is L1, a shortest distance between the second end of the battery body and a side beam of the pack body close to the second end of the battery body is L2, and a length L0 of the one of the plurality of cells meets: L1+L2<L0.

9. The power battery pack according to claim 1, wherein a length direction of the one of the plurality of cells is in parallel with a width direction of the power battery pack, and the plurality of cells are arranged along a length direction of the power battery pack; and
 the battery body extends along the width direction of the power battery pack.

10. The power battery pack according to claim 7, wherein the pack body comprises two side beams located respectively on two sides of the power battery pack in the width direction of the power battery pack, and the first and second ends of the battery body are supported respectively by the two side beams; and
 the pack body comprises two end beams located respectively at two ends of the power battery pack in the length direction of the power battery pack.

11. The power battery pack according to claim 1, wherein a length direction of the one of the plurality of cells is in parallel with a width direction of the power battery pack, the plurality of cells are arranged along the length direction of the power battery pack, and at least two layers of battery arrays are arranged in the pack body along a height direction of the power battery pack.

12. The power battery pack according to claim 1, wherein a length direction of the one of the plurality of cells is in parallel with a length direction of the power battery pack, and the plurality of cells are arranged along a width direction of the power battery pack; and
 only one cell is accommodated in the pack body in the length direction of the power battery pack.

13. The power battery pack according to claim 1, wherein a length direction of the one of the plurality of cells is in parallel with a length direction of the power battery pack, and the plurality of cells are arranged along a width direction of the power battery pack; and
 in the length direction of the power battery pack, a shortest distance between the first end of the battery body and a first end beam of the pack body close to the first end of the battery body is L3, a shortest distance between the second end of the battery body and a second end beam of the pack body close to the second end of the battery body is L4, and a length L0 of each cell meets: L3+L4<L0.

14. The power battery pack according to claim 1, wherein a length direction of the one of the plurality of cells is in parallel with a length direction of the power battery pack, and the plurality of cells are arranged along a width direction of the power battery pack; and
 the one of the plurality of cells extends along the length direction of the power battery pack.

15. The power battery pack according to claim 12, wherein the pack body comprises two end beams located respectively on two ends of the power battery pack in the length direction of the power battery pack, and the first and second ends of the battery body are supported respectively by the two end beams; and
 the pack body comprises two side beams located at two sides of the power battery pack in the width direction of the power battery pack.

16. The power battery pack according to claim 12, wherein at least two layers of battery arrays are arranged in the pack body along a height direction of the power battery pack.

17. The power battery pack according to claim 1, wherein the pack body comprises a vehicle-use tray connected to a vehicle body.

18. The power battery pack according to claim 1, wherein a width F of the pack body in a width direction of the power battery pack is 500 mm to 1500 mm.

19. The power battery pack according to claim 1, further comprising at least one of a battery management system and a battery thermal management system.

20. The power battery pack according to claim 1, wherein the pack body is integrally formed on an electric vehicle.

21. The power battery pack according to claim 1, wherein the battery body has a length L, a width H, and a thickness D, the length L of the battery body is greater than the width H, and the width H of the battery body is greater than the thickness D, wherein the length L and the width H of the battery body meet: L/H=4 to 21.

22. The power battery pack according to claim 1, wherein a length L of the battery body and a thickness D of the battery body meet: L/D=23 to 208.

23. The power battery pack according to claim 1, wherein a length L of the battery body and a volume V of the battery body meet: L/V=0.0005 to 0.002 $mm^{-2}$.

24. The power battery pack according to claim 1, wherein a width H of the battery body and a volume V of the battery body meet: H/V=0.0001 to 0.00015 $mm^{-2}$.

25. The power battery pack according to claim 1, wherein a thickness D of the battery body and a volume V of the battery body meet: $D/V = 0.0000065$ mm to $0.00002$ mm$^{-2}$.

26. The power battery pack according to claim 1, wherein a length L of the battery body and a total outer surface area S of the battery body meet: $L/S = 0.002$ to $0.005$ mm$^{-1}$.

27. The power battery pack according to claim 1, wherein a total outer surface area S of the battery body and a volume V of the battery body meet: $S/V = 0.1$ to $0.35$ mm$^{-1}$.

28. The power battery pack according to claim 1, wherein a length L of the battery body is 600 mm to 2500 mm.

29. The power battery pack according to claim 1, wherein each of the plurality of cells comprises an explosion-proof valve disposed on at least one of the first end and the second end of the battery body.

30. The power battery pack according to claim 1, wherein each of the first and second ends of the battery body is provided with an explosion-proof valve, and the explosion-proof valves are configured to discharge gas through different exhaust channels.

* * * * *